United States Patent [19]
Maeno

[11] Patent Number: 6,058,268
[45] Date of Patent: *May 2, 2000

[54] CAMERA WITH SELF-DIAGNOSTIC FUNCTION

[75] Inventor: Hitoshi Maeno, Kagoshima-ken, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/192,027

[22] Filed: Nov. 13, 1998

[30] Foreign Application Priority Data

Nov. 18, 1997 [JP] Japan ................................. 9-317254

[51] Int. Cl.[7] ................................................. G03B 431/00
[52] U.S. Cl. .............................. 396/48; 396/281; 396/310
[58] Field of Search .............................. 396/48, 281, 287, 396/292, 300, 310, 311, 321

[56] References Cited

U.S. PATENT DOCUMENTS

Re. 36,252  7/1999  Kobayashi et al. ................. 396/287 X
5,278,606   1/1994  Ohsawa .................................... 396/292
5,574,520  11/1996  Ishihara ................................... 396/111
5,809,345   9/1998  Numako ..................................... 396/48

FOREIGN PATENT DOCUMENTS 2-603934   1/1997  Japan .
10-73876   3/1998  Japan .

*Primary Examiner*—W. B. Perkey
*Attorney, Agent, or Firm*—Frishauf, Holtz, Goodman, Langer & Chick, P.C.

[57] ABSTRACT

A self-diagnostic camera is disclosed which checks the state of each of components operating to take a picture and, upon detecting the occurrence of an abnormal operation, stops the camera operation, reads a corresponding error code from an error code storage unit, and adds the error code to an error history storage unit through an add and update unit. When the storage capacity of the error history storage unit is reached, error codes already stored are transferred to the memory in the add and update unit. Address shift is then made to remove the least recently stored error code and add the most recent error code to the end. The updated error codes in the memory are written again into the error history storage unit. The error codes are read to outside as required.

15 Claims, 26 Drawing Sheets

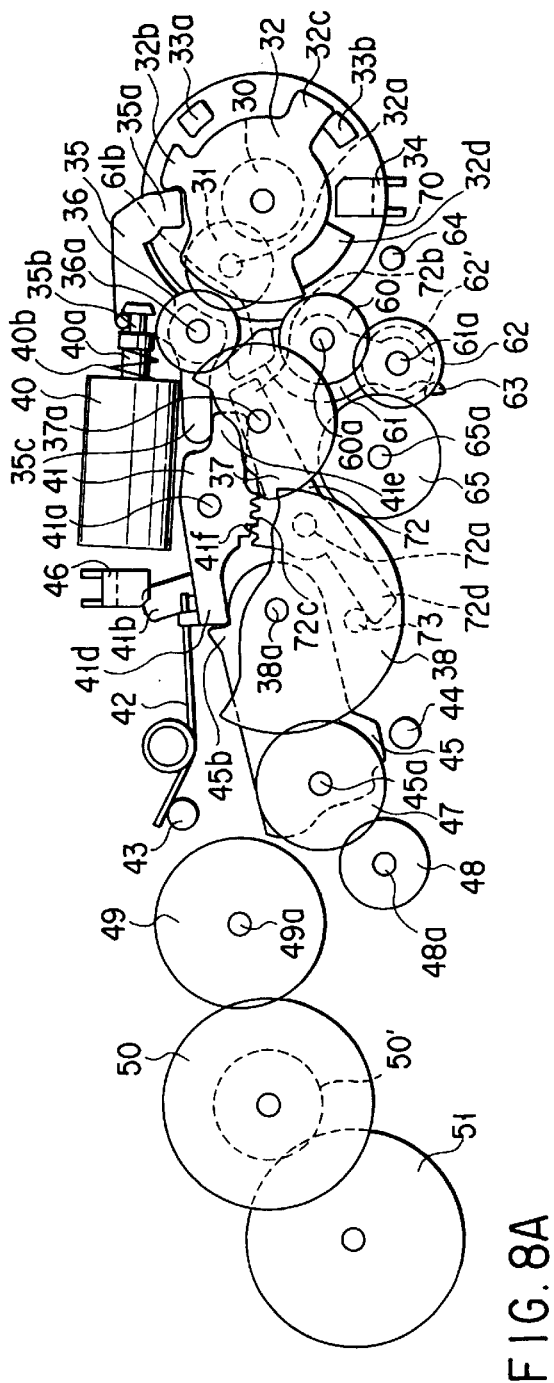
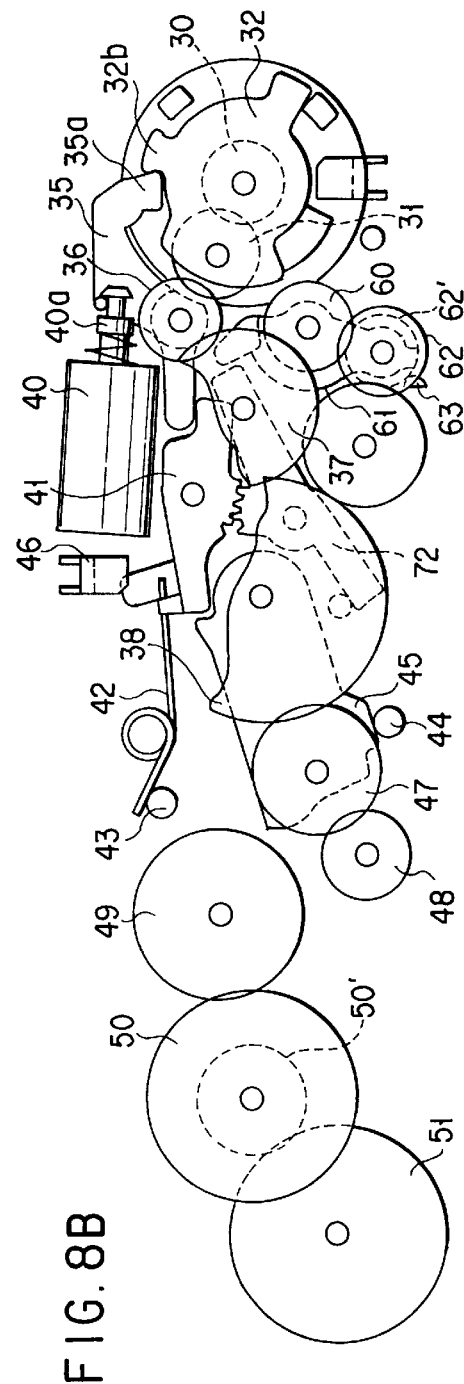
FIG. 8A
FIG. 8B

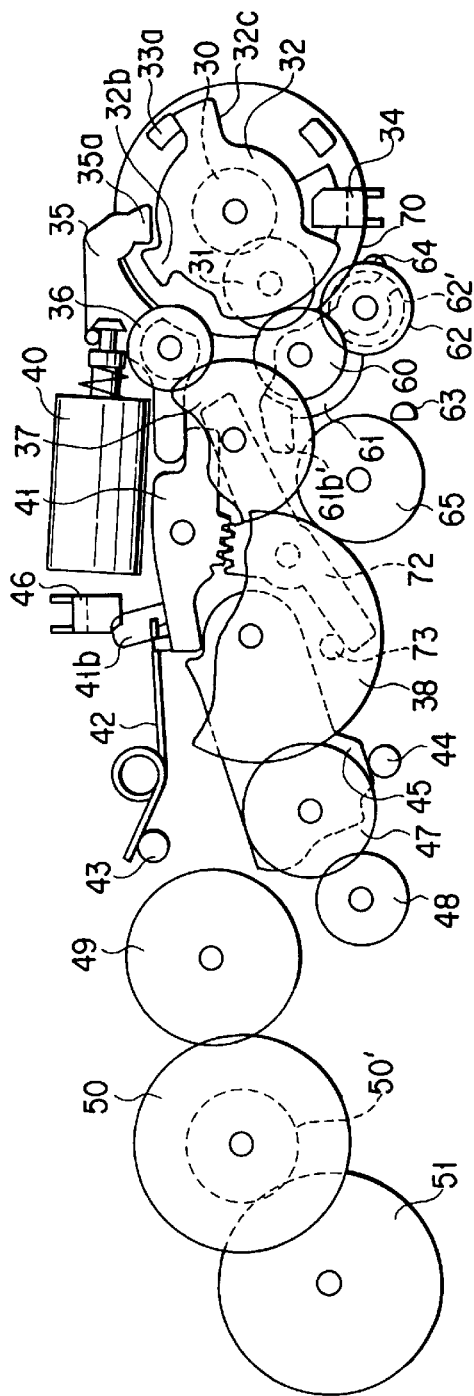
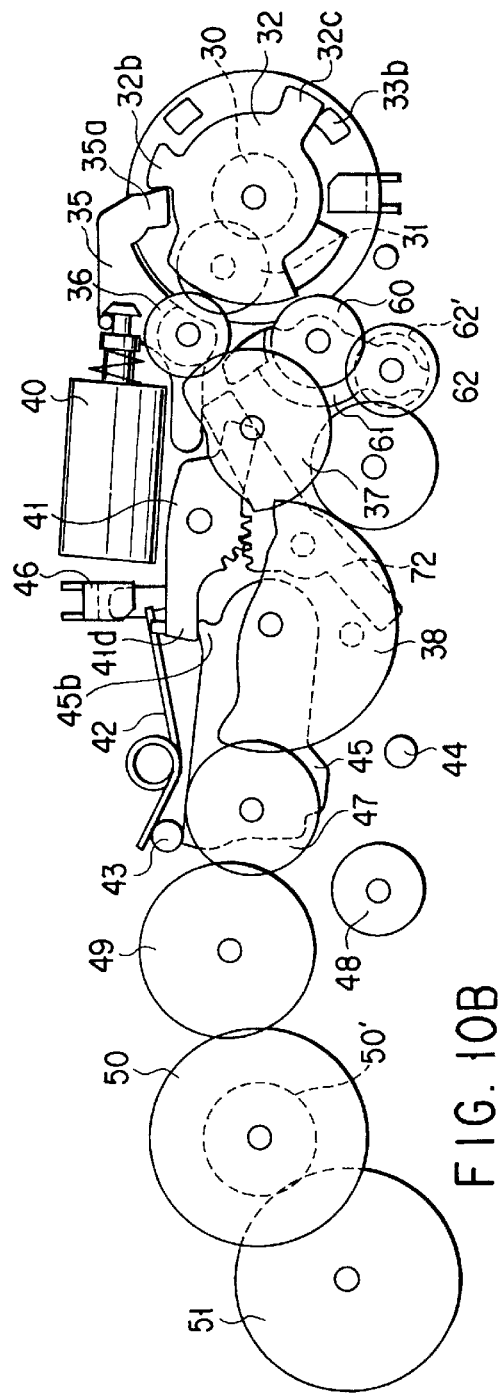
FIG. 10A
FIG. 10B

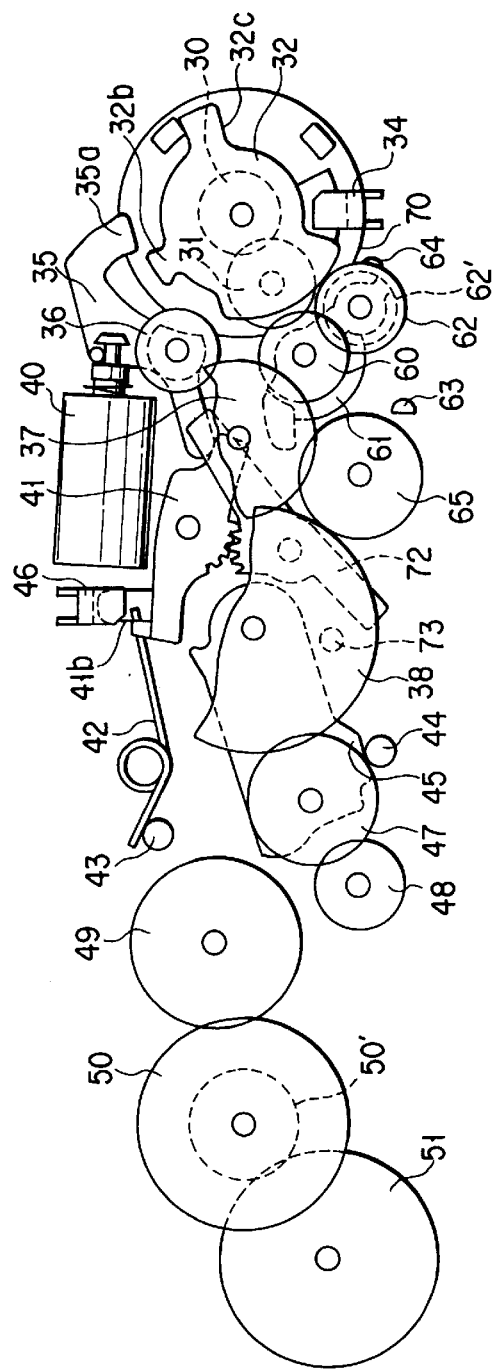
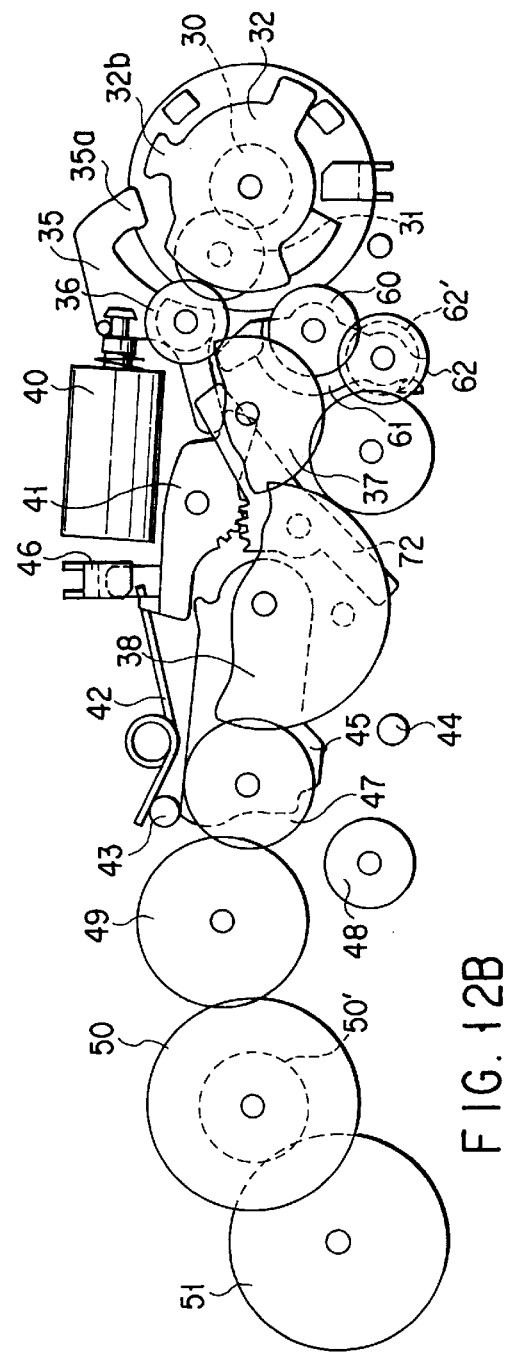
FIG. 12A
FIG. 12B

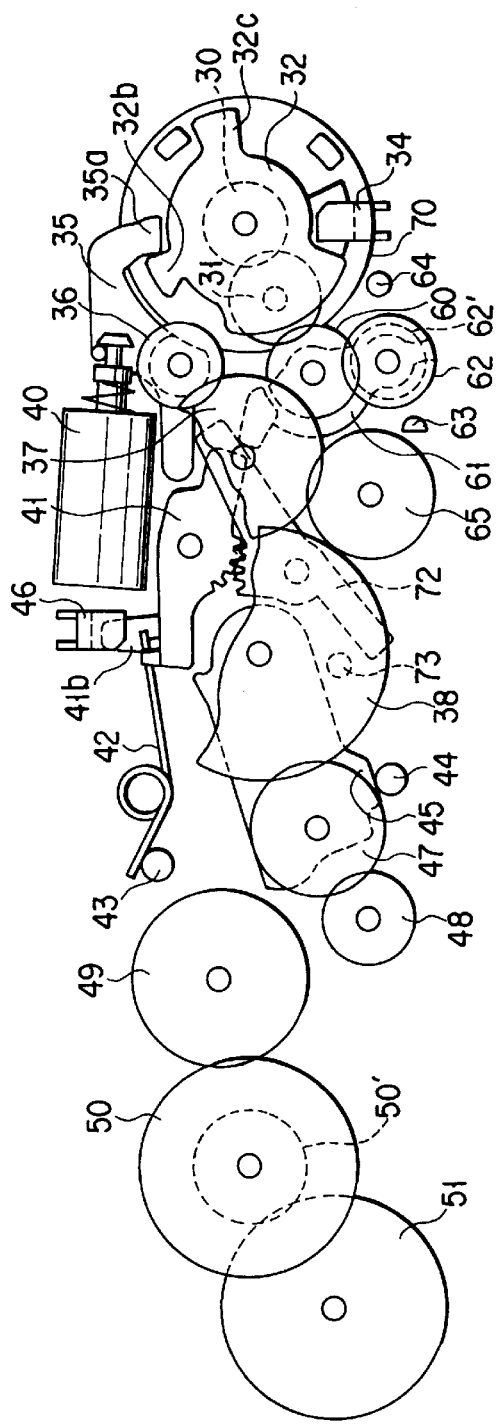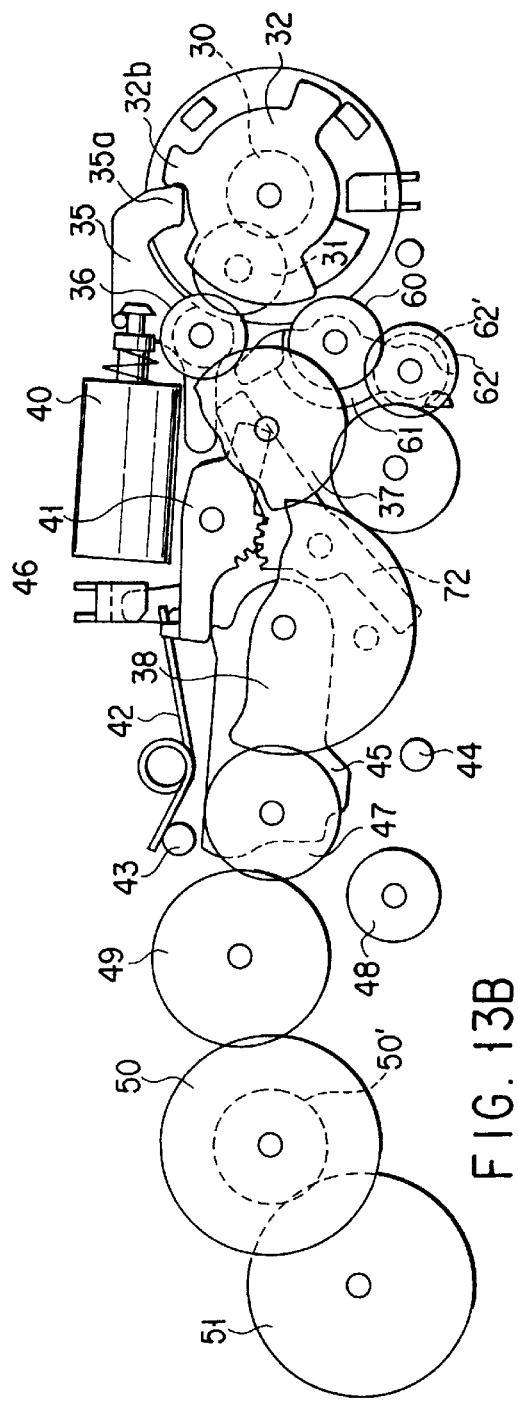

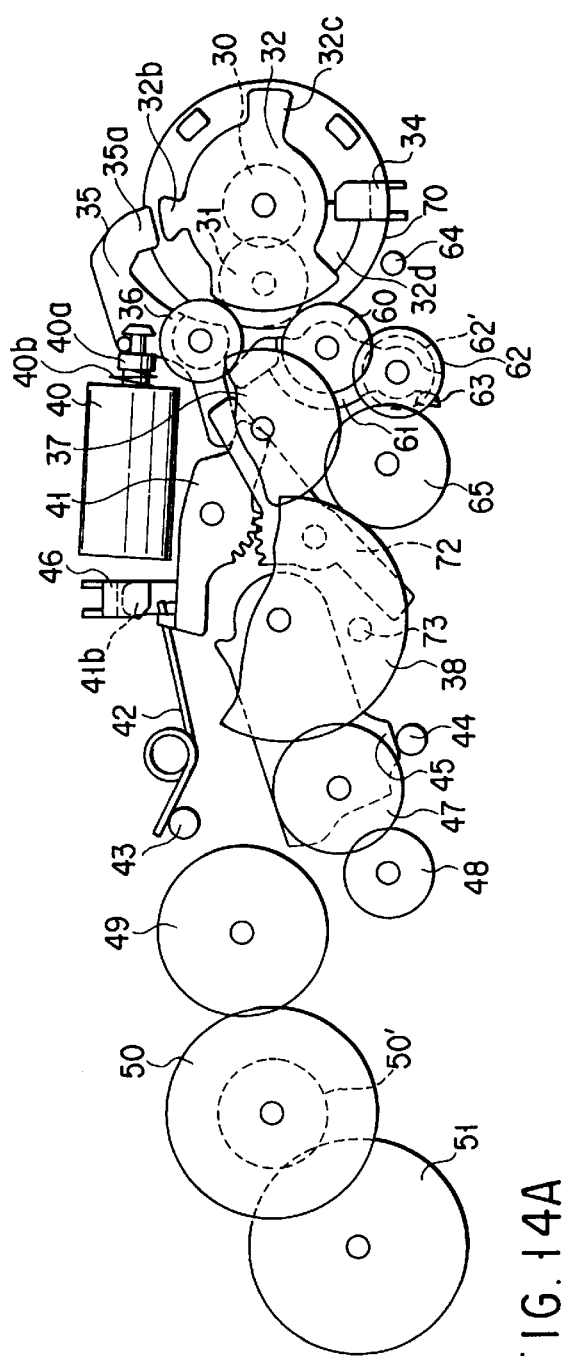
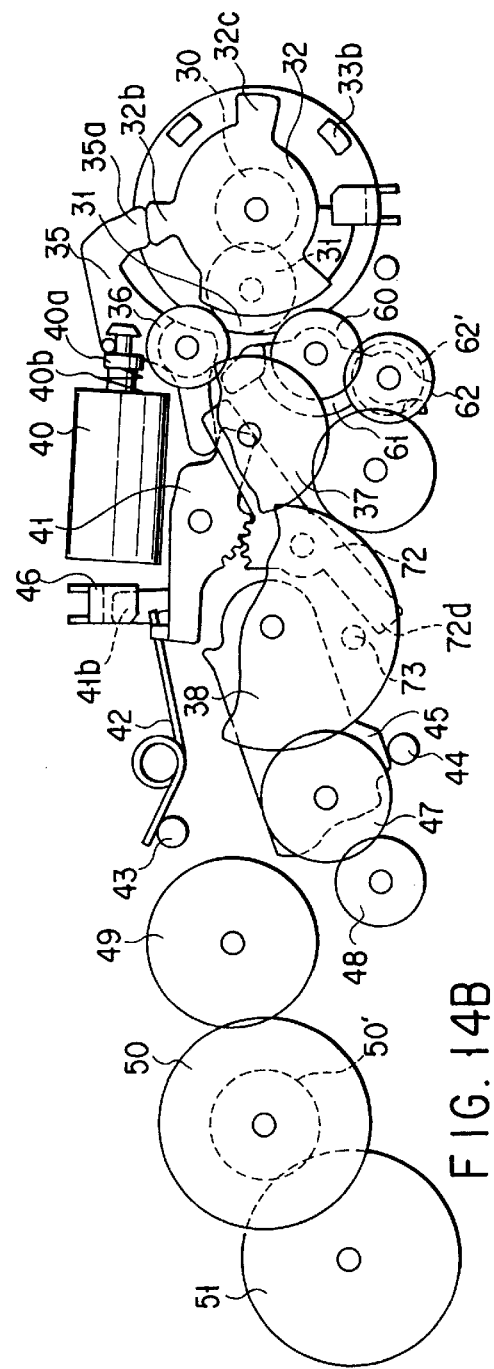
FIG. 14A
FIG. 14B

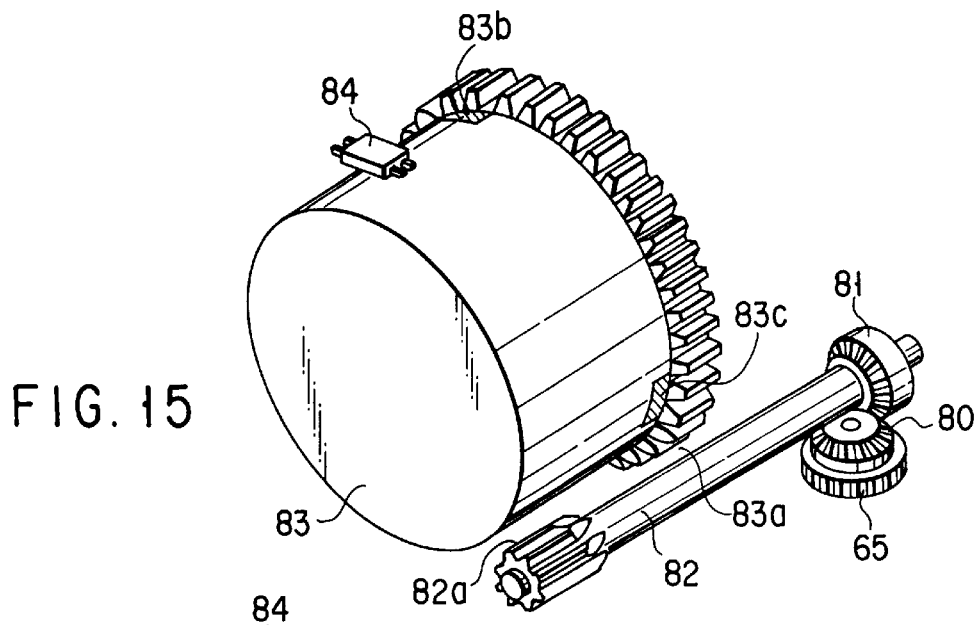
FIG. 15
FIG. 16
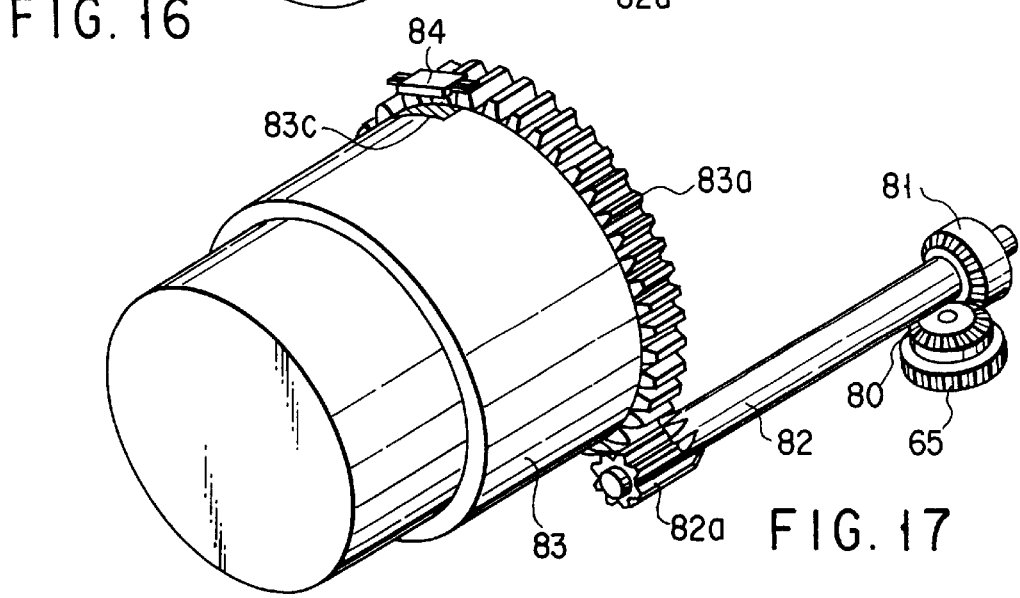
FIG. 17

CAMERA WITH SELF-DIAGNOSTIC FUNCTION

BACKGROUND OF THE INVENTION

The present invention relates to a camera which automatically performs photographing-related operations and more particularly to a camera which self-checks abnormal operations that may occur when its components operate in succession to take a picture and records their history as corresponding code numbers.

In general, cameras are known which have a built-in computer that controls the operation of their components in accordance with programs in order to perform automatically photographing-related operations so that the mere depression of the shutter release allows distance measurement, photometry, exposure, and film rewinding.

With conventional primary cameras which require photographers to perform manually a series of photographing-related operations, such as distance measurement, photometry, exposure, and film rewinding, each operation is performed as a single unit. When an abnormal operation occurs due to a failure, therefore, the photographer can identify its cause relatively easily at that time.

However, with automatic cameras which are constructed so that photographing-related operations are performed in series or in parallel, the photographers cannot know that what abnormal operation occurred when what operation was performed.

As an example, in Japanese Patent No. 2-603934 assigned to the same assignee as this application, there is disclosed a self-diagnostic camera, which has sensors built into its respective operating facilities. When a certain abnormal operation occurs continuously, the operation of the camera is stopped and, on the basis of detected signals from these sensors, the abnormal operation is processed in accordance with a preset program so that it is stored or displayed as a code number or a mark. In fixing, the stored code number or mark is read out to fix the failing part.

In general, devices or apparatuses constructed from mechanical parts each often have some operating tendency, depending on the assembly and adjustment of the parts in the process of manufacture, variations in precision of the parts, and characteristics of materials of the parts. That is, although failing parts differs from camera to camera, in many cases a failure occurs frequently in the same part or the same abnormal operation frequently occurs in each camera.

Thus, in the conventional camera which is designed such that the occurrence of an abnormal operation is displayed or recorded, an abnormal condition that has occurred can be understood; however, it is impossible to know how the abnormal condition has occurred or whether the abnormal condition is due to combined abnormality.

In particular, even in the event of abnormality, its record is not kept in the case where recovery from an abnormal operation can be made by turning the power switch off or resetting the operation of the camera. In addition, in the event of a failure from which recovery cannot be made by such operations, there is no record of information as to whether an abnormal operation has occurred before, whether this is the first time that it has occurred, or whether it has occurred frequently in the past, the information being important for fixing the camera.

BRIEF SUMMARY OF THE INVENTION

It is an object of the present invention to provide a camera with a self-diagnostic function which permits abnormal operations that have occurred in the camera to be recorded in a sequential order of time, causes of the abnormal operations to be made clear by knowing particulars so far, and failing parts to be located easily for fixing.

A self-diagnostic camera thus arranged checks the state of each of components which are in operation for photographing or preparation for photographing and, upon detecting the occurrence of an abnormal operation, stops the camera operation, reads a corresponding error code from an error code storage unit, and adds the error code to error codes already stored in an error history storage unit through an add and update unit. When the storage capacity of the error history storage unit is reached, the error codes already stored are transferred to the memory in the add and update unit. Address shift is then made to remove the least recently stored error code and add the most recent error code to the end. The updated error codes in the memory are written again into the error history storage unit. The error codes are read to outside as required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A and 8B are plan views illustrating an operating state of the camera driving mechanism of FIG. 4;

FIGS. 10A and 10B are plan views illustrating still another operating state of the camera driving mechanism of FIG. 4;

FIGS. 12A and 12B are plan views illustrating another operating state of the camera driving mechanism of FIG. 4;

FIGS. 13A and 13B are plan views illustrating still another operating state of the camera driving mechanism of FIG. 4;

FIGS. 14A and 14B are plan views illustrating another operating state of the camera driving mechanism of FIG. 4;

FIG. 15 is a perspective view of the lens barrel in the position in which it is housed;

FIG. 16 is a perspective view of the lens barrel in the picture-taking position;

FIG. 17 is a perspective view of the lens barrel which has been moved forward into the TELE setting end position;

FIG. 19 is a flowchart illustrating a photographing sequence involving driving control after the power is turned on;

DETAILED DESCRIPTION OF THE INVENTION

Figure 1:
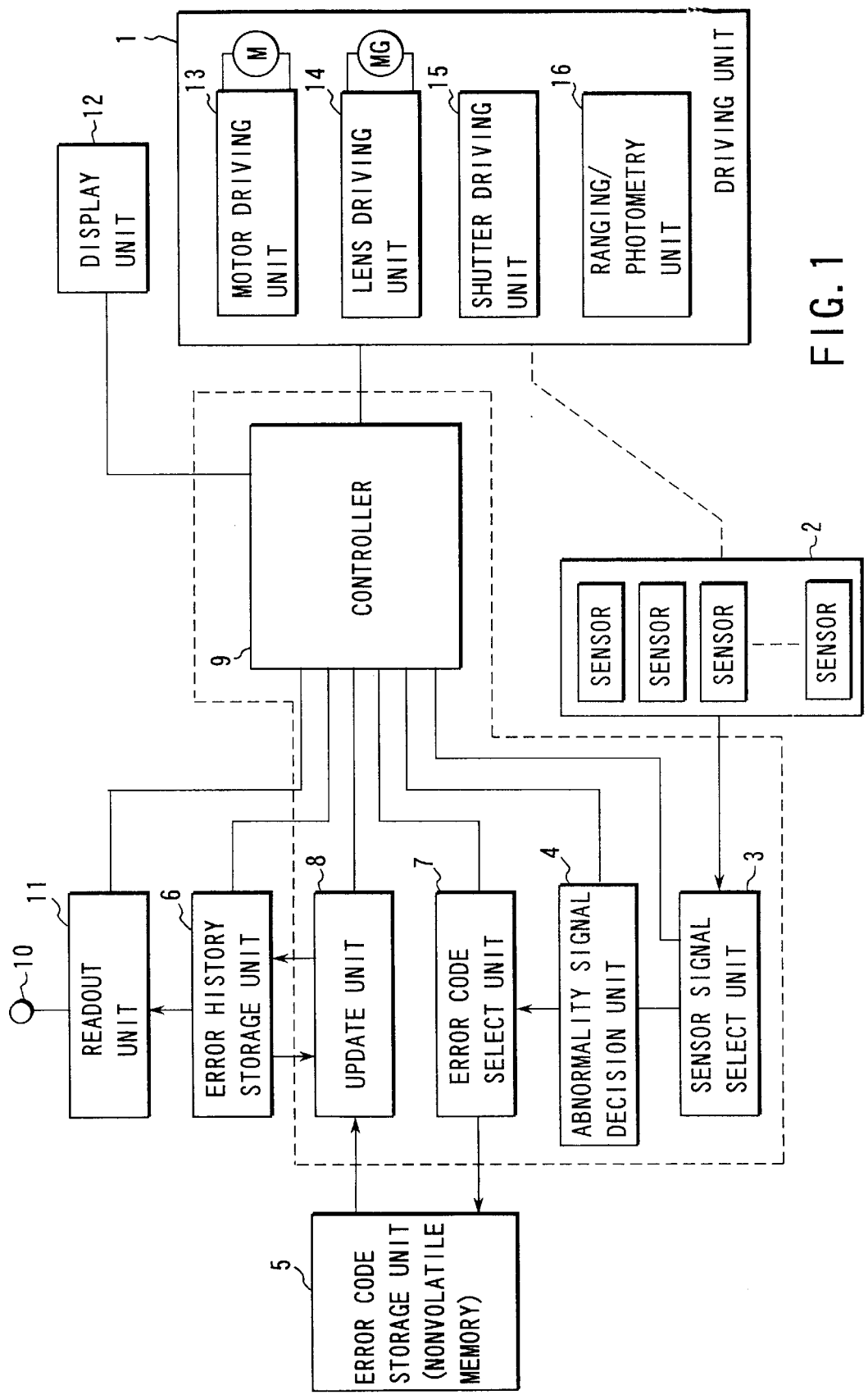
FIG. 1 is a schematic representation of a camera with a self-diagnostic function according to an embodiment of the present invention.

Referring now to FIG. 1, there is illustrated in block diagram form a camera with a self-diagnostic function embodying the present invention.

The camera of the present invention comprises a driving unit 1, a sensor unit 2, a sensor signal select unit 3, an abnormality signal decision unit 4, an error code storage unit 5 comprising a nonvolatile memory, an error history storage unit 6, an error code select unit 7, an update unit 8, a controller 9 for overall control, an data output terminal 10, a readout unit 11, and a display unit 12.

The driving unit 1 drives a number of components for taking pictures. The sensor unit 2 comprises a number of sensors each placed in a respective one of moving parts in the driving unit 1. The sensor signal select unit 3 makes a selection among signals detected by the sensors in the sensor unit 2 and enters it into the abnormality decision unit 4.

The abnormality signal decision unit 4 makes a decision as to whether or not a detect signal entered from the sensor signal select unit 3 is an abnormality signal. The error code storage unit 5 comprises a nonvolatile memory, such as a ROM, which prestores error codes which are made to correspond with abnormal operations indicated by detect signals (abnormality signals) outputted by the respective sensors. The error history storage unit 6, which is rewritable, has a table in which a plurality of error codes indicating abnormal operations occurred are stored in a sequential order of time.

The error code select unit 7, when detecting by the abnormality signal decision unit that a detect signal output from a sensor is an abnormality signal, reads a corresponding error code from the error code storage unit 5. The update unit 8 reads an error history comprised of a plurality of error codes from the error history storage unit 6 and adds an error code indicating the most recent abnormal operation which is output by the error code select unit 7 to the end of the error history. At this point, when the storage capacity is reached, the update unit rewrites into the error history storage unit an error history from which the least recent (the oldest) error code has been removed. The readout unit 11 reads the error history from the error history storage unit and outputs it to the outside via the output terminal 10.

The display unit 12, as required, displays an abnormal operation occurred or the stored error history in terms of characters, numerals, or pictures.

Moreover, the driving unit 1 comprises a motor driving unit 13 for driving moving parts for winding and rewinding film and moving the picture-taking lens forward or backward, etc., while switching through a gear coupling mechanism, a lens driving unit 14 for driving an electromagnet for autofocusing the picture-taking lens, a shutter driving unit 15 for driving the shutter release for exposure, a ranging/photometry unit 16, and so on.

The abnormality signal decision unit 4, the error code select unit 7, the update unit 8 and the controller 9 may be implemented by a microcomputer by way of example.

In this embodiment, the error code storage unit 5 comprises a nonvolatile memory such as a ROM, the error history storage unit 6 comprises a rewritable nonvolatile memory such as an EEPROM (electrically erasable programmable read-only memory), and the update unit 8 has a memory such as a RAM.

Figure 2:
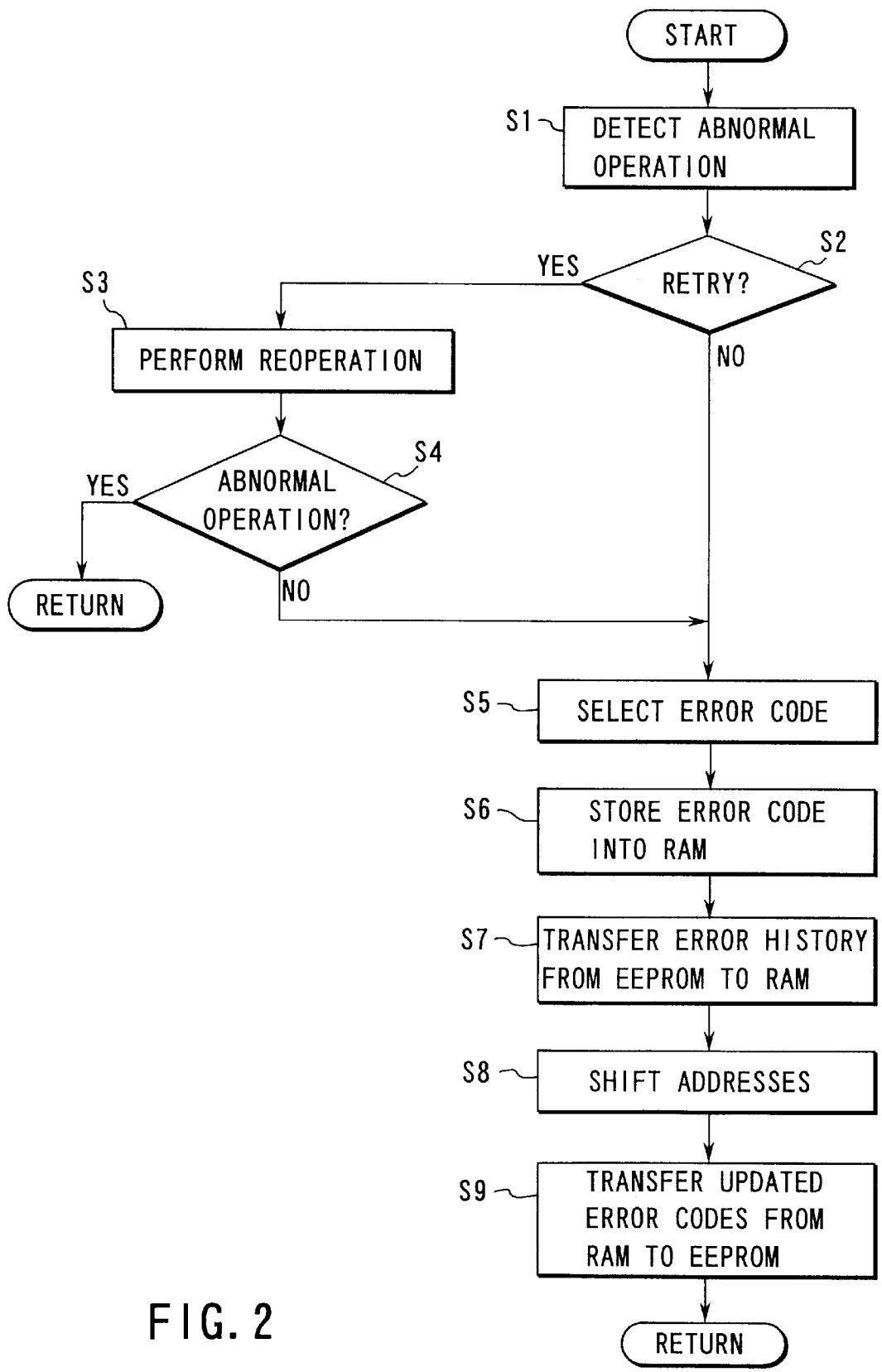
FIG. 2 is a flowchart illustrating the operation of the camera.

Next, reference will be made to a flowchart illustrated in FIG. 2 to describe the operation of the camera of the present invention.

First, the abnormality signal decision unit 4 makes a decision as to whether the operation is normal or abnormal based on output signals of the sensors that detect the state of the driving unit 1 which is in operation for shooting or preparation for shooting. When an abnormality signal due to the occurrence of an abnormal operation is detected (step S1), the controller 9 makes a decision as to whether to make a retry (step S2). If the decision is retry (YES), then the controller reoperates the driving unit (step S3) and makes a decision as to whether it operates normally or not (step S4). If the decision is normal operation, then the procedure goes to the next operation.

If the decision in step S4 is improper operation (NO) or the decision in step S2 is not retry (NO), then the controller instructs the error code select unit 7 to read a corresponding error code from among error codes stored in the error code storage unit 5 and then stores the read error code into the RAM of the update unit 8 (step S6).

At the same time, error codes already stored in the error history storage unit 6, consisting of EEPROM, are transferred to and stored in the RAM of the update unit 8 (step S7).

Figure 3:
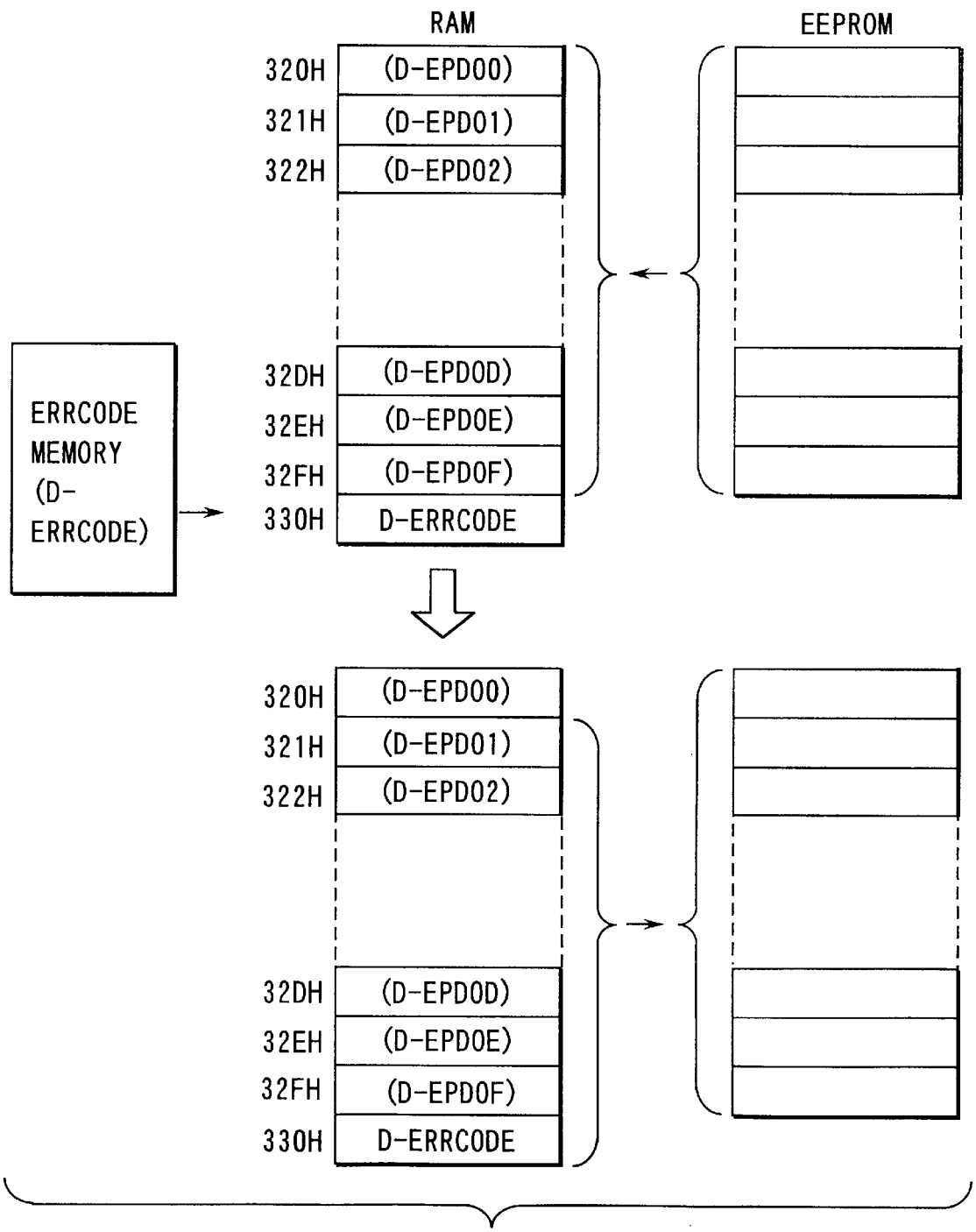
FIG. 3 illustrates error codes in the embodiment.

Here, reference will be made to FIG. 3 to describe updating of the error history storage unit 6 by adding a new error code thereto by the update unit 8. FIG. 3 shows an example of a table for storing error codes.

In the above arrangement, when some abnormal operation occurs in the driving unit 1 in operation, it is detected by one or more sensors that monitor the operating state of the driving unit. A corresponding error code is read out of the error code storage unit 5, which stores error codes in such a way that they are made to correspond with sensors, and then stored at the end of the stored table in the update unit 8.

At this point, error codes (D_EPD00 through D_EPD0F) indicating abnormal operations that have occurred in the past which have been already stored in the error history storage unit 6 are read into the update unit 8. In this embodiment, the error history storage unit 6 has a capacity to store 16 error codes. Of course, this is not restrictive and the number of codes that can be stored may be reduced or increased as needed.

The update unit 8 thus stores 17 error codes of 16 error codes (D_EPD00 through D_EPD0F) plus the most recent error code (D_DRRCODE).

The update unit 8 shifts error code addresses (step S8) and rewrites 16 error codes containing the error codes (D_EPD01 through D_EPD0F) and the error code (D_ERRCODE) except the error code (D_EPD00) into the error history storage unit 6 (step S9), thereby updating data.

Such updating of error codes allows 16 recent error codes to be stored at all times and reference to these error codes allows causes of abnormal operations to be identified from abnormal operations occurred thus far, thus allowing for proper fixing.

For an abnormal operation from which recovery is made by a reoperation, its occurrence itself may be stored.

Next, a description will be given of the detection of abnormal operations by sensors and examples of error codes to be stored for the operating states of the respective driving units in order to perform the self-diagnostic function of the camera of the present invention.

First, Table 1 shows operating states in abnormal operations of the gear coupling mechanism, abnormality decision conditions, error codes, and corresponding steps in flowcharts to be described later.

TABLE 1

| Operating conditions and error conditions of gear coupling device | Operations | Error code | Corresponding step in flowchart |
|---|---|---|---|
| After gear switching, arm 1 position and arm 1 flag differ | Display and recording of the occurrence of abnormality | 51H | S142 |
| In switching arm 1, plunger cannot be pulled | After 16 retries, display and recording in the presence of abnormality | 52H | S219 |
| In switching arm 1, clutch PI makes no change | Display and recording of the occurrence of abnormality | 53H | S152 |
| In switching arm 1, stopper PI makes no change | Display and recording of the occurrence of abnormality | 54H | S159 |
| In switching arm 2 into retraction side, stopper PI makes no rise | After retry, display and recording in the presence of abnormality | 55H | S168 |
| In switching arm 2 into rewind side, plunger cannot be pulled | After 16 retries, display and recording in the presence of abnormality | 56H | S219 |
| After switching arm 2 into rewind side, stopper PI = L | After retry, display and recording in the presence of abnormality | 57H | S183 |
| In switching arm 3 into zoom side, stopper PI makes no rise | Display and recording of the occurrence of abnormality | 58H | S190 |
| In switching arm 3 into zoom side, stopper PI makes no fall | Display and recording of the occurrence of abnormality | 59H | S193 |
| In switching arm 3 into wind side, plunger cannot be pulled | After 16 retries, display and recording in the presence of abnormality | 5AH | S219 |
| In switching arm 3 into wind side, motor cannot be driven by a predetermined number of pulses with plunger pulled | Display and recording of the occurrence of abnormality | 5BH | S202 |
| In switching arm 3 into wind side, stopper PI makes no fall | Display and recording of the occurrence of abnormality | 5CH | S207 |

Moreover, Table 2 shows operating states in abnormal operations of the zoom facility, abnormality decision conditions, error codes, and corresponding steps in flowcharts to be described later.

TABLE 2

| Operating conditions and error conditions of zoom mechanism | operations | error code | corresponding step in flowchart |
|---|---|---|---|
| Hitting is detected before WIDE position is reached manually or by zoom down operation | Display and recording of the occurrence of abnormality | 70H | S238 |
| In manual zoom-up, reset PR is in "H" state even if TELE position pulse is produced (when no silver seal is detected) | After retry, display and recording in the presence of abnormality | 71H | S238 |
| After driving into retraction, reset PR = L (stay over silver seal) even after completion of retraction | After retry, display and recording in the presence of abnormality | 72H | S249 |
| In driving into retraction, reset PR = H irrespective of WIDE position (reset PR stays over silver seat) | After retry, display and recording in the presence of abnormality | 73H | S238 |
| At setup, hitting is detected before being driven through WIDE position pulse At setup, reset PR = L even at the time of WIDE position pulse | After retry, display and recording in the presence of abnormality | 74H | S101 |
| During setup, hitting is detected before detection of silver seal in WIDE position | After retry, display and recording in the presence of abnormality | 75H | S101 |
| During setup, no WIDE position hitting is detected ever after 6400 MT pulse count During setup, a minimum number of drive pulses is not reached yet when hitting is detected During setup, hitting is detected after 4096 pulse count or silver seal is not detected | After retry, display and recording in the presence of abnormality | 76H | S101 |

The error codes used in this embodiment are represented in hexadecimal; however, this is not restrictive and any other notation can be used, provided that each error code can be identified.

FIGS. 4 through 30 show specific examples in this embodiment. Note that the reference numerals of the structural elements are indicated representatively in FIG. 4 and some of them may be omitted from other figures. More specifically, FIGS. 4 through 7 and FIGS. 15 through 17 are enlarged perspective views illustrating an arrangement and driven states of the driving unit including the gear coupling mechanism built into the camera of this embodiment. FIGS. 8 through 14 are plan views illustrating the operating states of the driving unit of the camera of this embodiment.

With reference to FIGS. 4 through 17 the arrangement of the driving device for moving the lens barrel forward or backward and winding or rewinding film will be described. The driving device in this embodiment uses a single motor as a driving source and transfers its rotation to various moving parts by switching the gear coupling mechanism. Assume that the camera body is situated below the driving device which is shown in perspective in FIGS. 4 through 7.

A motor 20 is a reversible one, which has a pinion gear 21 mounted on its output axis. The pinion gear 21 meshes with a first sun gear 30 through a reduction gear train (not shown) to transfer the torque of the motor 20 to the first sun gear.

A first gear arm 32 as a coupling arm is mounted on top of the first sun gear 30 and made to rotate coaxially with it. A pin 32a is mounted perpendicularly to the first gear arm 32. A first planetary gear 31 is pivoted on the pin 32a in a state where it meshes with the first sun gear 30.

There is a given amount of friction between the first planetary gear 31 and the first gear arm 32; thus, the rotation of the first sun gear will give some torque to the first gear arm 32 in the direction of its rotation.

The first gear arm 32 is provided with protrusions 32b and 32c adapted to stop its rotation and a light-blocking portion 32d for interrupting a clutch PI (photointerrupter 34).

On the orbit of the first planetary gear 31 that revolves around the first sun gear are placed a gear 36 pivoted on a shaft 36a which is a following gear and a third sun gear 60 pivoted on a shaft 60a which is a following gear as well.

A first stopper 35 is mounted on the shaft 36a so that it can rotate coaxially with the gear 36.

Figure 9A:
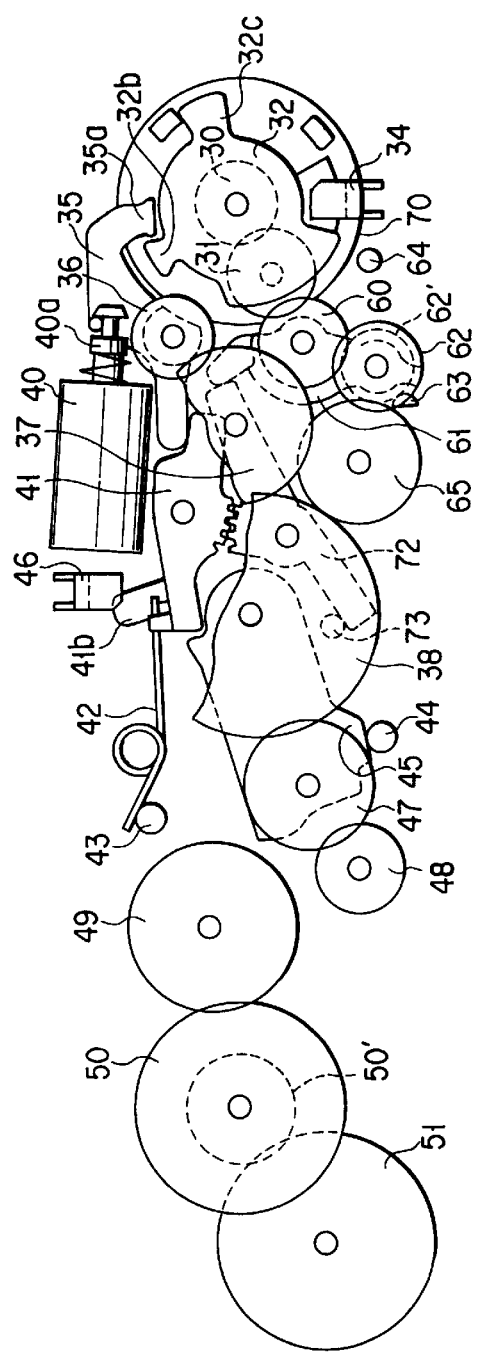
FIGS. 9A and 9B are plan views illustrating another operating state of the camera driving mechanism of FIG. 4.
Figure 9B:
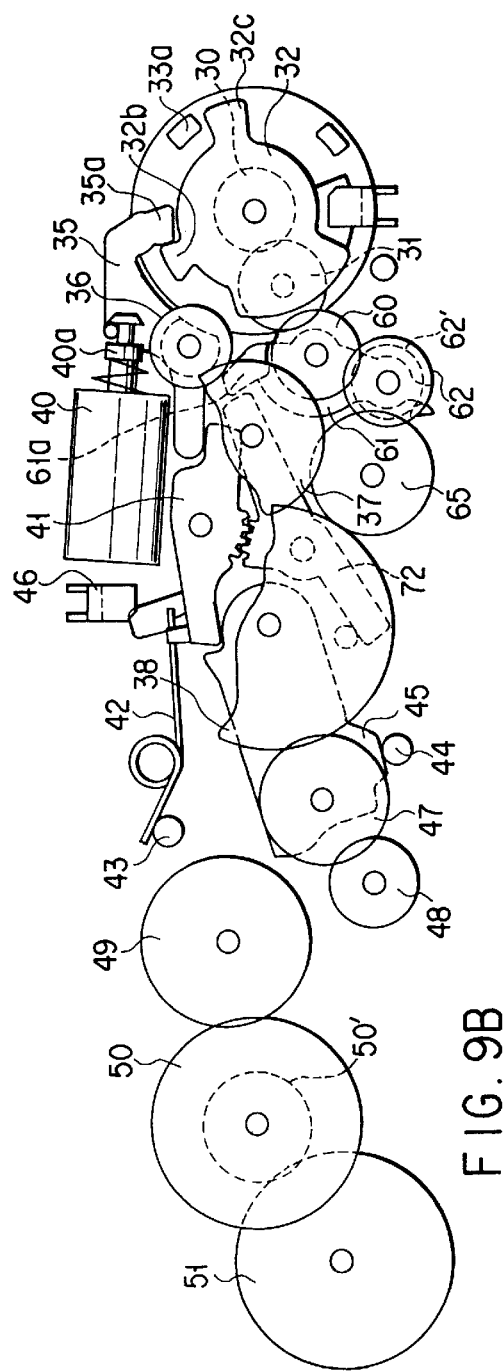

The first stopper 35 is provided at its end with an engagement member 35a that stops the counter-clockwise (CCW) rotation of the first gear arm as shown in FIG. 8B and stops its clockwise (CW) rotation as shown in FIG. 9B. Around the first gear arm 32 are provided positioning members 33a and 33b. The member 33a regulates the CW rotation of the first arm gear as shown in FIG. 5A and the member 33b regulates the CCW rotation of the first gear arm as shown in FIG. 9A.

The gear 36 meshes with the gear 37 mounted on a shaft 37a, which, in turn, meshes with a second sun gear 38 mounted on a shaft 38a.

Below the second sun gear 38 is placed a second gear arm 45, serving as a coupling arm, which is allowed to rotate coaxially with the second sun gear. Perpendicular to the second gear arm is attached a pin, on which a second planetary gear 47 is mounted in a state where it meshes with the second sun gear 38.

There is a given amount of friction between the second planetary gear 47 and the second gear arm 45. Thus, the rotation of the second sun gear 38 gives some torque to the second gear arm 45 in the direction of the rotation of the second sun gear 38.

On the orbit of revolution of the second planetary gear 47 around the second sun gear 38 are placed a set gear 48 which is a following gear and mounted on a shaft 48a and a gear 49 which is also a following gear and mounted on a shaft 49a.

The gear 49 transmits a torque through a stepped gear 50, a reduction gear, to a rewind gear 51 as a rewind driving mechanism. The rewind gear is provided with a protruding claw (not shown) which engages with the film spool within a film cassette to rewind film. When rotated in the CW direction, the gears rewind film into the cassette.

The set gear 48 allows the lens barrel 83 to move from the retracted position (the state of FIG. 15) to the shooting position (the state of FIG. 16) (hereinafter this operation is referred to as a setup operation) and from the shooting position to the retracted position (hereinafter this operation is referred to as a setdown operation).

That is, the set gear 48, which terminates the set driving gear train, allows the lens barrel 83 to perform a setup operation when rotated in the CW direction and a setdown operation when rotated in the CCW direction.

In the position below the second sun gear 38 is placed a shaft 41a, on which a second stopper 41 is mounted rotatably.

The second stopper 41, as shown in FIG. 8A, has an arm 41d that engages with a protrusion 45b of the second gear arm 45 to stop its rotation in the CW direction.

Around the second gear arm 45 are provided positioning members 43 and 44, which regulate the rotation of the second gear arm 45 in the CW direction as shown in FIG. 10B and in the CCW direction as shown in FIG. 8B, respectively.

The second stopper 41 is formed with a light-blocking portion 41b that blocks light to a stopper PI (photointerrupter 46).

Below the third sun gear 60 is provided a third gear arm 61, a coupling arm, which is rotatably mounted on the shaft 60a of the sun gear. Perpendicular to the third gear arm 61 is provided a pin 61a, on which third planetary gears 62 and 62', consisting of a stepped gear, are mounted to mesh with the third sun gear 60. Note that, of the gears 62 and 62', it is the third planetary gear 62 that meshes with the third sun gear 60.

There is a given amount of friction between the gears 62 and 62' and the third gear arm 61. Thus, when the third sun gear 60 is rotated, the friction gives some torque to the third gear arm 61 in the direction of rotation of the third sun gear.

On the orbit of revolution of the third planetary gear 62 are placed a zoom gear 65, a following member, which is mounted on a shaft 65a and a wind gear 70 which serves as a film winding mechanism and is integral with the film winding spool. The gear 65 is placed in the position below the gears 37 and 38 where there is no interference with these gears.

A first zoom bevel gear 80 (see FIG. 15, etc.) is provided which is mounted on the shaft 65a of the zoom gear 65 to rotate together with it. Further, a second zoom bevel gear 80 is placed in the position where it meshes with the first bevel gear 80, thereby changing the direction of the driving axis by 90° to coincide with the direction of the optical axis of the lens barrel.

A zoom long gear 82 is provided which is coaxial with and rotates together with the second zoom bevel gear 81. The gear 82 is formed at its tip with gear teeth 82a that mesh with teeth 83a of the lens barrel 83 when it is placed in the shooting position.

When the zoom gear 65 is rotated in the CW direction, the rotation is transmitted through the zoom gear train to the lens barrel 83 to allow it to zoom down. On the other hand, when the zoom gear is rotated in the CCW direction, the lens barrel zooms down.

Silver seals 83b and 83c are put on the lens barrel 83 to detect the absolute position of the lens barrel when it is zooming up or down.

Of the third planetary gears 62 and 62' of the stepped gear, the gear 62, which is larger, can mesh with the zoom gear 65. On the other hand, the smaller gear 62' can mesh with the wind gear 70.

In the position below the second sun gear 38 where there is no interference with that gear is provided a shaft 72a, on which a third stopper 72 is rotatably mounted.

The stopper 72 has an arm 72b that stops the rotation of the third gear arm 61 in the CCW direction.

Positioning members 63 and 64 are placed around the third gear arm 61. The member 63 regulates the rotation of the third gear arm in the CW direction as shown in FIG. 9B, while the member 64 regulates the rotation of the third gear arm in the CCW direction as shown in FIG. 10A.

The first stopper 35 is pivoted on the shaft 36a and has a protruding pin 35b.

In the vicinity of the first stopper 35 is placed a plunger type of electromagnet 40, which is provided with a moving ion core 40a which, when the electromagnet is energized, is attracted in the left direction in FIG. 8A and a compression coil spring 40b which thrusts the core in the right direction.

The moving iron core 40a, when the electromagnet 40 is not energized, is pushed in the right direction in FIG. 8A and has its position regulated by a positioning pin not shown into the position shown in FIG. 8A.

Figure 11A:
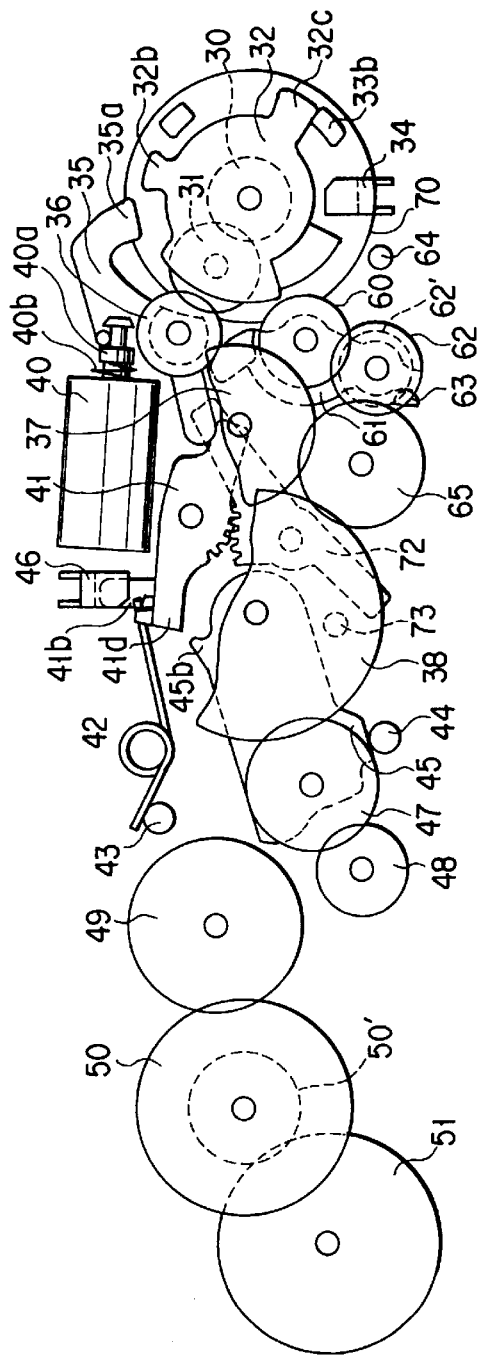
FIGS. 11A and 11B are plan views illustrating a further operating state of the camera driving mechanism of FIG. 4.

By making the force of the compression spring 40a smaller than the force of attraction of the electromagnet 40 when energized, the iron core 40a can be attracted in the left direction of FIG. 8A when the electromagnet is energized (see FIG. 11A).

The iron core 40a of the electromagnet 40 is formed at its tip with a notch into which a protruding pin 35b of the first stopper 35 is fitted. Thus, when the electromagnet is energized and consequently the iron core 40a is moved in the left direction of FIG. 8A, the first stopper 35 rotates in the CCW direction. On the other hand, the first stopper rotates in the CW direction when the electromagnet is deenergized and the iron core is therefore moved in the right direction of FIG. 8A by the force of the compression spring 40b.

On the opposite side of the first stopper 35 from the engaging portion 35a is formed an arm 35c, which is positioned below the gear 37 and hence does not interfere with that gear.

The second stopper 41, rotatably mounted on the shaft 41a, has a gear portion 41f and an arm portion 41e in the right-hand portion. The second stopper further has a protrusion 41d serving as an engagement portion.

In the vicinity of the second stopper 41 a pin 42a is provided so as to protrude from the body not shown. A torsion spring 42 is wound around the pin 42a and has its one end engaged with the positioning member 43 and its other end engaged with one end of the second stopper 41, thus urging the second stopper in the CCW direction. The second stopper is situated below the gears 37 and 38 and hence cannot interfere with those gears.

The third stopper 72, rotatably mounted on the shaft 72a, has a gear portion 72c at its central portion, an engagement member 72b at its right end, and an arm portion 72d at its left end.

In the vicinity of the third stopper 72 is provided a pin 73 to protrude from the camera body not shown. The pin 73 regulates the rotation of the third stopper in the CW direction. The third stopper is placed below the gears 37 and 38 and hence cannot interfere with these gears.

The gear portion 41f of the second stopper 41 and the gear portion 72c of the third stopper 72 mesh with each other, so that the rotation of the second stopper in the CW direction results in the rotation of the third stopper in the CCW direction. The second stopper, although being subjected to force in the CCW direction by the torsion spring 42, is held in the position shown in FIG. 8A because the third stopper is brought into contact with the positioning pin 73.

The arm portion 41e of the second stopper 41 and the arm portion 35c of the first stopper 35 have some gap therebetween in the direction of rotation and are placed at the same level in the direction of height.

When the electromagnet 40 is energized and the moving iron core 40a is then attracted in the left direction, the first stopper 35 rotates in the CCW direction. At this point, the engagement portion 35a of the first stopper 35 rotates up to the position outside the first gear arm 32, namely, up to the position where the engagement portion 35a does not contact the protrusion 32b.

When the first stopper 35 rotates in the CCW direction, its arm 35c forces the arm 41e of the second stopper 41 against the force of the torsion spring 42, so that the second stopper 41 rotates in the CW direction and as a result the third stopper 72 rotates in the CCW direction.

At this point, the engagement portion 41d of the second stopper 41 rotates up to the position outside the orbit of rotation of the protrusion 45b that stops the rotation of the second gear arm 45, namely, up to the position where the engagement portion 41d does not contact the protrusion 45b. The engagement portion 72b of the third stopper 72 rotates up to the position outside the orbit of rotation of the protrusion 61b of the third gear arm 61 (see FIG. 11A).

When the power to the electromagnet 40 is turned off, the moving iron core 40a is forced back by the compression spring 40b to the position defined by the positioning pin, thereby allowing the first stopper 35 to rotate in the CW direction.

With the rotation of the first stopper 35, the second and third stoppers 41 and 72 are rotated by the force of the torsion spring 42 in the CCW direction and the CW direction, respectively, until the arm 72d of the third stopper 72 is brought into contact with the positioning pin 73 (see FIG. 8A).

The engagement arm 72b of the third stopper 72 is placed above the arm 41e of the second stopper 41, providing some gap in the trust direction.

In the above-described driving device, when the rewind gear 51 is rotated in the CW direction, the film is rewound into the cassette.

When the set gear 48 is rotated in the CW direction, the setup operation is performed by which the lens barrel 83 is moved into the shooting position (the state of FIG. 16). This setup operation allows the gear teeth 83a of the lens barrel 83 to mesh with the gear teeth 82a of the zoom long gear 82.

By this setup operation, the lens barrel 83 is moved, so that the silver seal 83b also moves. At the completion of the setup operation, the silver seal 83b comes immediately under the reset PR 84, thus switching a signal of the reset PR from OFF to ON.

When the set gear 48 is rotated in the CCW direction, on the other hand, the setdown operation is performed, so that the lens barrel is moved back into the position where it is housed (the position shown in FIG. 15). In this state, the gear teeth 83a of the lens barrel 83 and the gear teeth 82a of the zoom long gear 82 get out of mesh.

The setdown operation results in the movement of the silver seal 83b, switching the signal of the reset PR 84 from ON to OFF.

In such a shooting position as shown in FIG. 16, when the zoom gear 65 is rotated in the CCW direction, a zoom-up operation of the lens barrel 83 is performed, so that the lens is moved into the zoom-up extreme position as shown in FIG. 17. In this case, depending on whether the silver seal 83c has come immediately under the reset PR 84, a decision can be made as to whether the lens has been moved into the zoom-up extreme position.

When the zoom gear 65 is rotated in the CW direction, on the other hand, a zoom-down operation of the lens barrel 83 is performed.

When the wind gear 70 is rotated in the CW direction, an operation of winding film is performed.

The setup and setdown operations are performed through the use of driving power transmitted by a first gear driving system composed of the gear 36, the gear 37, the second sun gear 38, the second planetary gear 47, the second gear arm 45, and the set gear 48.

The zoom-up and zoom-down operations are performed through the use of driving power transmitted by a second gear driving system constructed from the third sun gear 60, the third planetary gear 62, the third gear arm 61, and the zoom gear 65.

Next, the driving operation and the driving-power switching operation of the driving unit, or the gear coupling unit, constructed as described so far will be described with reference to FIGS. 4 through 14.

Figures 4, 5:
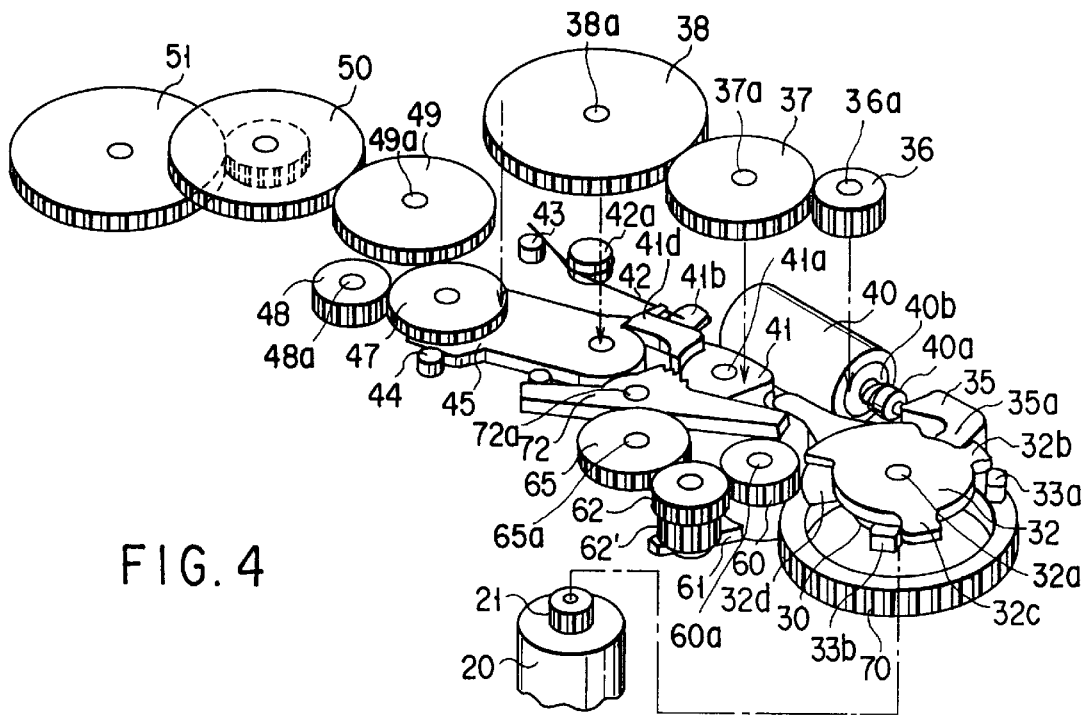
FIG. 4 is an enlarged perspective view of the driving mechanism built into the camera, the mechanism being in one driven state.
FIG. 5 is an enlarged perspective view illustrating another driven state of the camera driving mechanism of FIG. 4.

In FIGS. 4 and 8A, when the camera power switch (not shown) is turned ON and the motor 20 is rotated in the CW direction, the first sun gear 30 rotates in the CW direction. Then, the first gear arm 32 rotates in the CCW direction and the protrusion 32c engages with the positioning member 33b, rotating the first planetary gear 31 in the CCW direction. The gears 36 and 37 then rotates, causing the second sun gear 38 to rotate in the CW direction, the second gear arm 45 to rotate in the CW direction, and the protrusion 45b to engage with the second stopper 41. As a result, the second planetary gear 47 rotates in the CCW direction and the set gear 48 rotates in the CW direction, whereby a setup operation of the lens barrel 83 is performed.

In order to perform an operation of switching from the above-described setup operation to a zoom-up operation, the electromagnet 40 is simply energized so that the moving iron core 40a is moved in the left direction of FIG. 8A. The first stopper 35 then rotates in the CCW direction to push the second stopper 41. The second stopper then rotates in the CW direction, causing the third stopper 72 to rotate in the CCW direction (see FIG. 11A).

It should be noted that the force of attraction of the electromagnet 40 is set high enough to overcome the force of the compression spring 40b and the torsion spring 42.

When the second stopper 41 rotates, its light-blocking portion 41b enters the stopper PI 46, changing its output signal from ON to OFF. When the protrusion 45b of the second gear arm 45 and the arm 41d of the stopper 41 are clinging to each other and the iron core 40a cannot therefore be attracted, the stopper PI output signal will not change from ON to OFF. Upon detecting such a state, the power to the electromagnet is turned OFF once, the motor 20 is driven by a given amount in the CCW direction and the CW direction to loosen the clinging state, and the electromagnet 40 is energized again to thereby allow for the attraction of the iron core.

In the state of FIG. 11A, when the motor 20 is driven in the CCW direction with the electromagnet 40 energized, the sun gear 30 rotates in the CCW direction. Because of the presence of friction between the gear 36 and the camera body (not shown), the first planetary gear 31 revolves around the sun gear 30 while rotating on its own axis until it leaves the gear 36 (the state of FIG. 14A).

Note here that the friction torque of the gear 36 is set larger than that of the first planetary gear 31.

As shown in FIG. 14A, when the first gear arm 32 rotates in the CCW direction together with the first planetary gear 31, its light blocking portion 32*d* enters the clutch PI 34, changing its signal from ON to OFF. Thereby, the power to the electromagnet 40 is turned OFF with the motor 20 being rotated in the CCW direction.

When the electromagnet 40 is deenergized, the iron core 40*a* is pushed back by the force of the compression spring 40*b*, allowing the engagement portion 35*a* of the first stopper 35 to come into contact with the outer-diameter side surface of the first gear arm 32 as shown in FIG. 14B.

The first gear arm 32 rotates in the CCW direction with the first stopper 35 being in contact with its outer-diameter side surface by setting the friction torque of the first planetary gear 31 larger than torque acting on the first gear arm through the first stopper by the compression spring 40*b* and the torsion spring 42.

The friction between the third sun gear 60 and the camera body (not shown) allows the first planetary gear 31 to revolve around the sun gear 30 while rotating again on its own axis. The friction torque of the sun gear 60 is set larger than that of the first planetary gear 31.

When the first gear arm 32 continues its rotation in the CCW direction, the engagement portion 35*a* of the first stopper 35 gets out of engagement with the outer-diameter side surface of the protrusion 32*b* of the first gear arm 32, whereby the moving iron core 40*a* is pushed back into position defined by the positioning portion by the compression spring 40*b* and, at the same time, the first stopper 35 is driven to rotate in the CW direction.

The second stopper 41 and the third stopper 72 are rotated by the torsion spring 42 until the arm 72 of the third stopper comes into contact with the positioning member 73.

At this point, the light blocking portion 41*b* of the second stopper 41 leaves the stopper PI 46, switching the PI 46 signal from OFF to ON (see FIGS. 5 and 9B). The motor 20 is stopped in response to the detection of this signal.

The zoom-up operation of the lens barrel 83 is performed by rotating the motor 20 in the CCW direction and the first sun gear 30 in the CCW direction in FIGS. 5 and 9B. That is, this rotation causes the first gear arm 32 to rotate in the CCW direction, its protrusion 32*c* to come into contact with the positioning member 33*a*, the first planetary gear 31 to rotate in the CW direction, its protrusion 61*b* to come into contact with the third stopper 72, the third planetary gear 62 to rotate in the CW direction, and the zoom gear 65 to rotate in the CCW direction, thereby moving the lens barrel 83 in the zoom-up direction (the state of FIG. 9A).

On the other hand, the zoom-down operation of the lens barrel 83 is performed by rotating the motor 20 in the CW direction and the first sun gear 30 in the CW direction in FIGS. 5 and 9B. That is, this rotation causes the first gear arm 32 to rotate in the CW direction, its protrusion 32*b* to come into contact with the engagement portion 35*a* of the first stopper 35, the first planetary gear 31 to rotate in the CCW direction, the third gear arm 61 to rotate in the CW direction to come into contact with the positioning member 63, the planetary gear 62 to rotate in the CCW direction and the zoom gear 65 to rotate in the CW direction, thereby moving the lens barrel 83 in the zoom-down direction (the state of FIG. 9B).

For winding film after the zoom-up or zoom-down operation, the electromagnet 40 is energized to attract the iron core 40*a* in the left direction in FIGS. 5 and 9A or 9B. The first stopper 35 then rotates in the CCW direction to cause the second stopper 41 to rotate in the CW direction. As a result, the third stopper 72 rotates in the CCW direction (the state of FIG. 11B).

With the rotation of the second stopper 41, its light-blocking portion 41*b* enters the stopper PI 46, switching the PI 46 signal from ON to OFF. When, in this operation, the engagement portion 72*b* of the third stopper 72 and the protrusion 61*b* of the third gear arm 61 cling to each other or the engagement portion 35*a* of the first stopper 35 and the protrusion 32*b* of the first gear arm 32 cling to each other and the iron core 40*a* therefore cannot be attracted, the stopper PI output signal will not change from ON to OFF. By detecting such a state, the power to the electromagnet is turned OFF once, the motor 20 is driven by a given amount in the CCW direction and the CW direction to loosen the clinging state, and the electromagnet 40 is energized again to thereby allow for the attraction of the iron core.

Figure 11B:
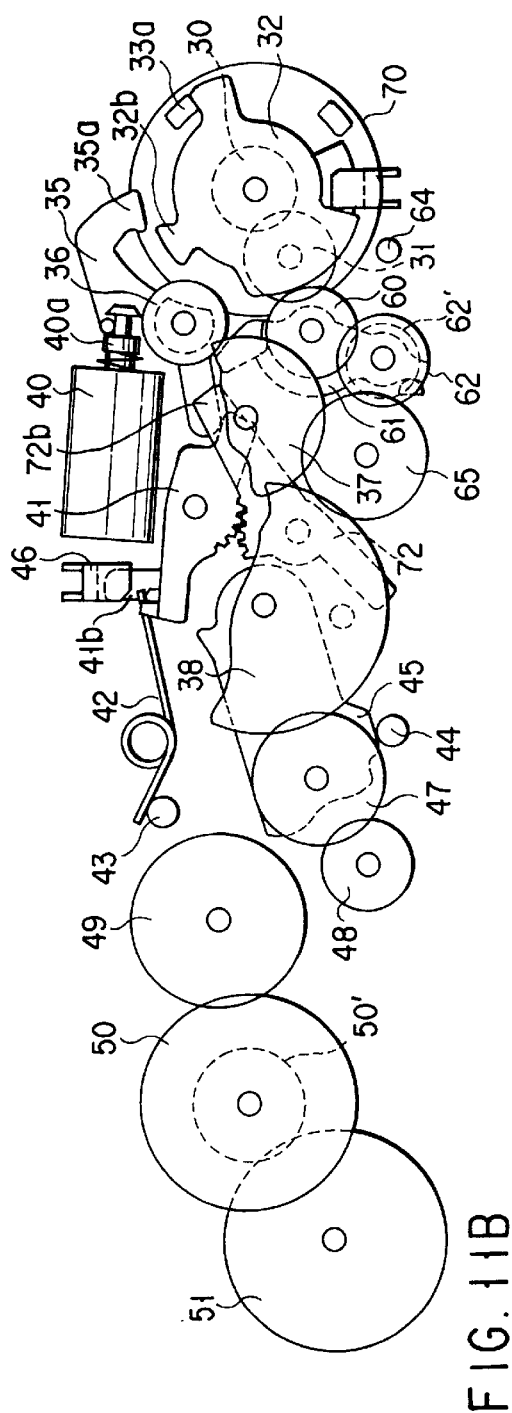

In the state of FIG. 11B, when the motor 20 is driven in the CCW direction with the electromagnet 40 energized, the first sun gear 30 rotates in the CCW direction. The first gear arm 32 comes into contact with the positioning member 33*a* and the first planetary gear 31 then rotates in the CW direction. Consequently, the third sun gear 60 rotates in the CCW direction and the third gear arm 61 then rotates in the CCW direction.

When, of the third planetary gears 62 and 62' of the stepped gear, the planetary gear 62 leaves the zoom gear 65 and the third gear arm 61 then comes into contact with the positioning member 64, the gear 62' meshes with the wind gear 70 (the state of FIG. 12A). In this case, the amount by which the motor is driven to switch the third planetary gears 62 and 62' from the zoom gear 65 to the wind gear 70 has been set in advance in terms of the amount of rotation (the number of rotations) of the motor 20. The motor is rotated by the set amount and then the power to the electromagnet 40 is turned OFF (the state of FIGS. 6 and 10A).

Figure 6:
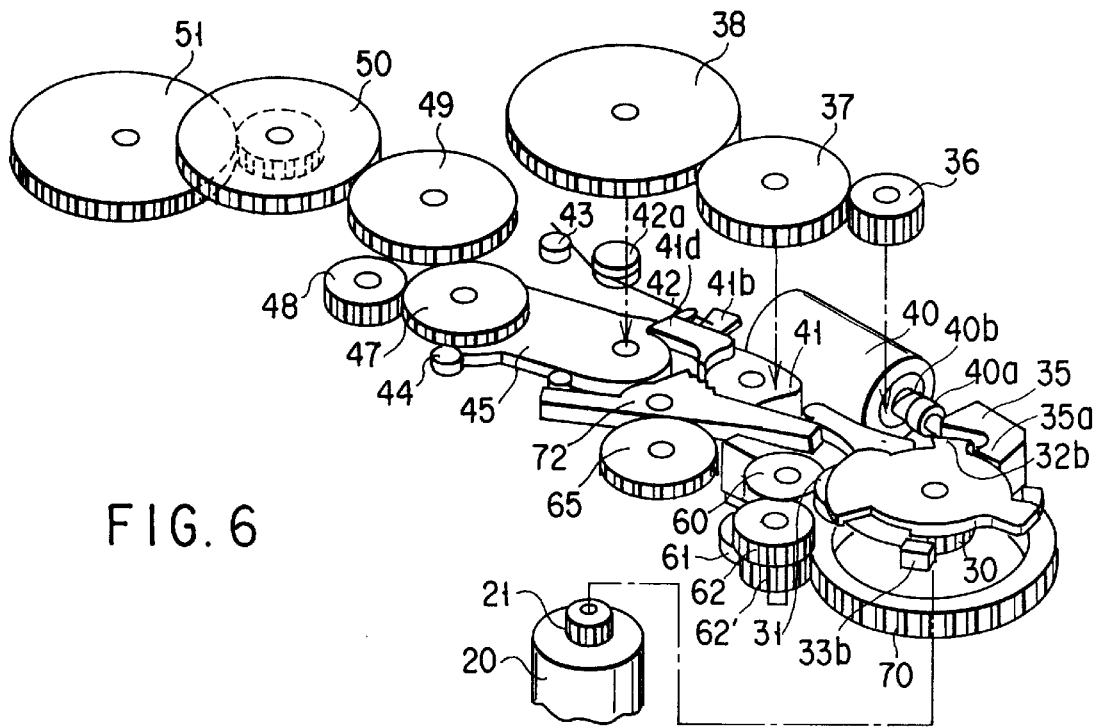
FIG. 6 is an enlarged perspective view illustrating still another driven state of the camera driving mechanism of FIG. 4.

For a film winding operation, the motor 20 is rotated in the CCW direction in FIGS. 6 and 10A. As a result, the first sun gear 30 rotates in the CCW direction, the first gear arm 32 rotates in the CCW direction, its protrusion 32*x* comes into contact with the positioning member 33*a*, the first planetary gear 31 rotates in the CCW direction, and the third sun gear 60 rotates in the CCW direction. Then, the third gear arm 61 rotates in the CCW direction to come into contact with the positioning member 64 and the third planetary gears 62 and 62' rotate in the CW direction. The third planetary gear 62' then causes the wind gear 70 to rotate in the CCW direction, allowing film winding.

For switching into a zoom operation after the completion of the film winding operation, the motor 20 is rotated in the CW direction in FIGS. 6 and 10A. Then, the first sun gear 30 rotates in the CW direction, the first gear arm 32 rotates in the CW direction, the protrusion 32b of the first gear arm 32 comes into contact with the engagement portion 35a of the first stopper 35, the first planetary gear 31 rotates in the CCW direction, and the third sun gear 60 rotates in the CW direction.

Since the friction torque of the third planetary gears 62 and 62' is set larger than the torque of the torsion spring 42 acting on the third stopper 72, the rotation of the third sun gear 60 in the CW direction allows the third gear arm 61 to rotate in the CW direction while pressing the side surface of the third stopper 72 with its protrusion 61b (the state of FIG. 13A). Thereby, the third stopper 72 is rotated in the CCW direction and the second stopper 41 is rotated in the CW direction. With the rotation of the second stopper 41, the light-blocking portion 41b goes into the stopper PI 46.

When, in this state, the third gear arm 61 continues to rotate in the CW direction, the third stopper 72 gets out of engagement with the protrusion 61b of the third gear arm 61, so that the second stopper 41 is rotated in the CCW direction and the third stopper 72 is rotated in the CW direction by means of the force of the torsion spring 42.

At this point, the light-blocking portion 41b of the second stopper 41 leaves the stopper PI 46, switching the PI 46 signal from OFF to ON. When this change in the state of the PI signal is detected, the motor 20 is stopped (the state of FIG. 9B).

For switching from the zoom operation to a setdown operation, the electromagnet 40 is energized after the completion of the zoom-down operation of the lens barrel 83 in FIGS. 5 and 9B. When the moving iron core 40a is thus attracted, the first stopper 35 rotates in the CCW direction and presses the second stopper 41. As a result, the second stopper 41 rotates in the CW direction and the third stopper 72 rotates in the CCW direction (the state of FIG. 11B).

With the rotation of the second stopper 41, its light blocking portion 41b goes into the stopper PI 46, switching the PI signal from ON to OFF. When, in this operation, the engagement portion 72b of the third stopper 72 and the protrusion 61b of the third gear arm 61 cling to each other or the protrusion 35a of the first stopper 35 and the protrusion 32b of the first gear arm 32 cling to each other and the iron core 40a therefore cannot be attracted, the stopper PI output signal will not change from ON to OFF. By detecting such a state, the power to the electromagnet is turned OFF once, the motor 20 is driven by a given amount in the CCW direction and the CW direction to loosen the clinging state, and the electromagnet 40 is energized again to thereby allow for the attraction of the iron core.

When, in the state of FIG. 11B, the motor 20 is rotated in the CW direction with the electromagnet 40 energized, the first sun gear 30 rotates in the CW direction. Because of the presence of friction between the third sun gear 60 and the camera body, the first planetary gear 31 first revolves around the first sun gear 30 while rotating on its own axis until it leaves the third sun gear 60 (the state of FIG. 14A).

The friction torque of the third sun gear 60 is set larger than that of the first planetary gear 31.

When the first gear arm 32 rotates in the CW direction as shown in FIG. 14A, its light blocking portion 32d leaves the clutch PI 34, switching its signal from OFF to ON. In response to this signal change, the electromagnet 40 is deenergized with the motor rotating in the CW direction.

When the electromagnet 40 is deenergized, the iron core 40a is pushed back by the force of the compression spring 40b, so that the engagement portion 35a of the first stopper 35 comes into contact with the side surface of the protrusion 32b of the first gear arm 32 (the state of FIG. 14B).

The first gear arm 32 rotates in the CW direction with the first stopper 35 in contact with its side surface. This is because the friction torque of the first planetary gear 31 is set larger than that of the first stopper 35 acting on the first gear arm 32 by means of the compression spring 40b and the torsion spring 42.

Because of the presence of friction between the gear 36 and the camera body as described before, the first planetary gear 31 revolves around the first sun gear 30 while rotating again on its own axis. When the first gear arm 32 continues rotating in the CW direction, the engagement portion 35a of the first stopper 35 gets out of engagement with the side surface of the protrusion 32b of the first gear arm 32. As a result, the iron core 40a is moved back into position by the force of the compression spring 40b and, at the same time, the first stopper 35 is rotated in the CW direction.

The second stopper 41 and the third stopper 72 are rotated by the force of the torsion spring 42 until the arm portion 72d comes into contact with the positioning member 73. At this point, the light blocking portion 41b of the second stopper 41 gets out of the stopper PI 46, switching the PI 46 signal from OFF to ON (the state of FIGS. 7 and 11A). Upon detection of this change in the PI signal, the motor 20 is stopped.

When the motor is rotated in the CCW direction in FIG. 8A, the first sun gear 30 rotates in the CCW direction, the first gear arm 32 rotates in the CCW direction, its protrusion 32b comes into contact with the first stopper 35, and the first planetary gear 31 rotates in the CW direction, the gears 36 and 37 rotates, causing the sun gear 38 to rotate in the CCW direction and the second gear arm 45 to rotate in the CCW direction until it comes into contact with the positioning member 44. Thereby, the setdown operation of the lens barrel 83 is performed (the state of FIG. 8B).

For switching from the setdown operation to a film rewinding operation, the electromagnet 40 is energized to attract the moving iron core 40a in FIGS. 4 and 8B. When the moving iron core 40a is thus attracted, the first stopper 35 rotates in the CCW direction and presses the second stopper 41. As a result, the second stopper 41 rotates in the CW direction and the third stopper 72 rotates in the CCW direction (the state of FIG. 11A).

With the rotation of the second stopper 41, its light blocking portion 41b goes into the stopper PI 46, switching the PI signal from ON to OFF. When, in this operation, the engagement portion 41d of the second stopper 41 and the protrusion 45b of the first gear arm 32 cling to each other or the protrusion 35a of the first stopper 35 and the protrusion 32b of the first gear arm 32 cling to each other and the iron core 40a therefore cannot be attracted, the stopper PI output signal will not change from ON to OFF. By detecting such a state, the power to the electromagnet is turned OFF once, the motor 20 is driven by a given amount in the CCW direction and the CW direction to loosen the clinging state, and the electromagnet 40 is energized again to thereby allow for the attraction of the iron core.

In the state of FIG. 11A, when the motor 20 is driven in the CW direction with the electromagnet 40 energized, the first sun gear 30 rotates in the CW direction. The first gear arm 32 comes into contact with the positioning member 33b and the first planetary gear 31 then rotates in the CCW direction. Consequently, the gear 36 rotates in the CW direction, the gear 37 rotates in the CCW direction, the second sun gear 38 rotates in the CW direction, and the second gear arm 45 rotates in the CW direction.

The second planetary gear 47 leaves the set gear 48, the second gear arm 45 comes into contact with the positioning member 43, and the second planetary gear 47 meshes with the gear 49 (the state of FIG. 12B). In this case, the amount by which the motor is driven to switch the planetary gears 47 from the set gear 48 to the gear 49 has been set in advance in terms of the amount of rotation of the motor 20. The motor is rotated by the set amount and then the power to the electromagnet 40 is turned OFF (the state of FIGS. 7 and 10B).

Figure 7:
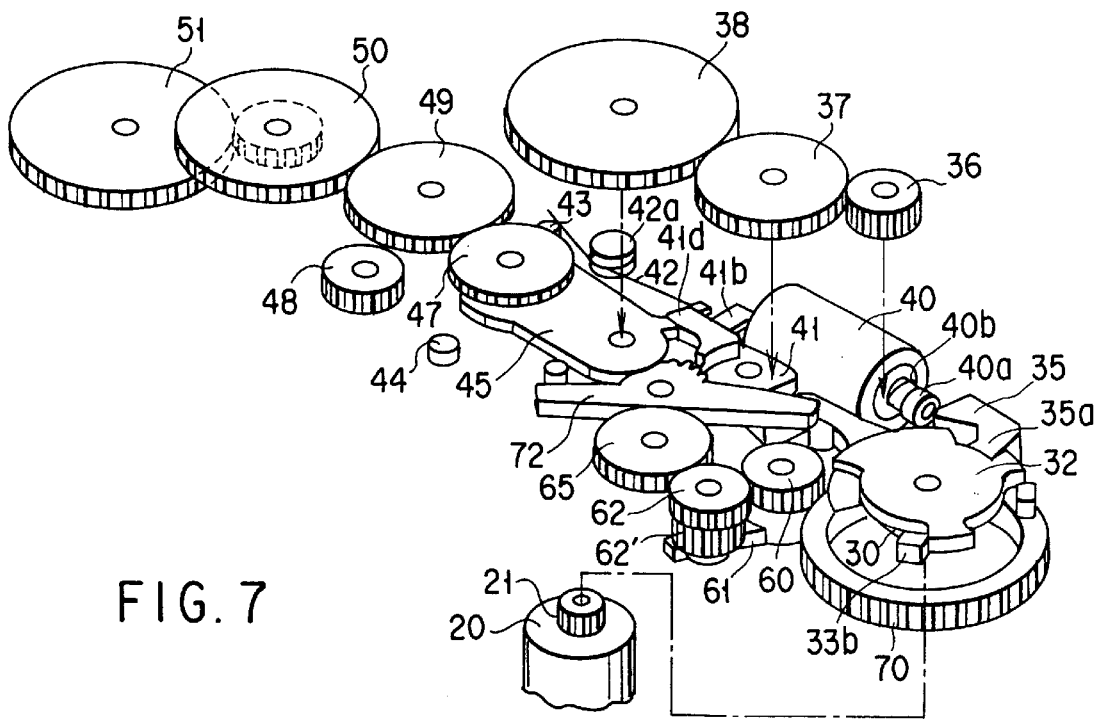
FIG. 7 is an enlarged perspective view illustrating a further driven state of the camera driving mechanism of FIG. 4.

For a film rewinding operation, the motor 20 is rotated in the CW direction in FIGS. 7 and 10B. As a result, the first sun gear 30 rotates in the CW direction, the first gear arm 32 rotates in the CW direction, its protrusion 32c comes into contact with the positioning member 33b. The first planetary gear 31 rotates in the CCW direction, the gear 36 rotates in the CW direction, the gear 37 rotates in the CCW direction, and the second sun gear 38 rotates in the CCW direction. Then, the second gear arm 45 rotates in the CW direction and comes into contact with the positioning member 43. The second planetary gear 47 rotate in the CCW direction. Thus, the gear 49 rotates in the CW direction, the stepped gears 50 and 50' rotate in the CCW direction, and the rewind gear 51 having a claw to rewind film rotates in the CW direction, allowing film rewinding.

For switching into a set operation after the completion of the film rewinding operation, the motor 20 is rotated in the CCW direction in FIGS. 7 and 10B. Then, the first sun gear 30 rotates in the CCW direction, the first gear arm 32 rotates in the CCW direction, the protrusion 32b of the first gear arm 32 comes into contact with the engagement portion 35a of the first stopper 35, the first planetary gear 31 rotates in the CW direction, the gear 36 rotates in the CCW direction, the gear 37 rotates in the CW direction, and the second sun gear 38 rotates in the CCW direction.

Since the friction torque of the second planetary gear 47 is set larger than the torque acting on the second gear arm 45 by the torsion spring 42, the rotation of the second sun gear 38 in the CCW direction allows the second gear arm 45 to rotate in the CCW direction.

When, in this state, the second gear arm 45 continues to rotate in the CCW direction, the engagement portion 41d of the second stopper 41 gets out of engagement with the protrusion 45b of the second gear arm 45, so that the second stopper 41 is rotated in the CCW direction and the third stopper 72 is rotated in the CW direction by means of the force of the torsion spring 42.

At this point, the light-blocking portion 41b of the second stopper 41 leaves the stopper PI 46, switching the PI 46 signal from OFF to ON. When this change in the state of the PI signal is detected, the motor 20 is stopped (the state of FIGS. 4 and 8B).

Figure 18:
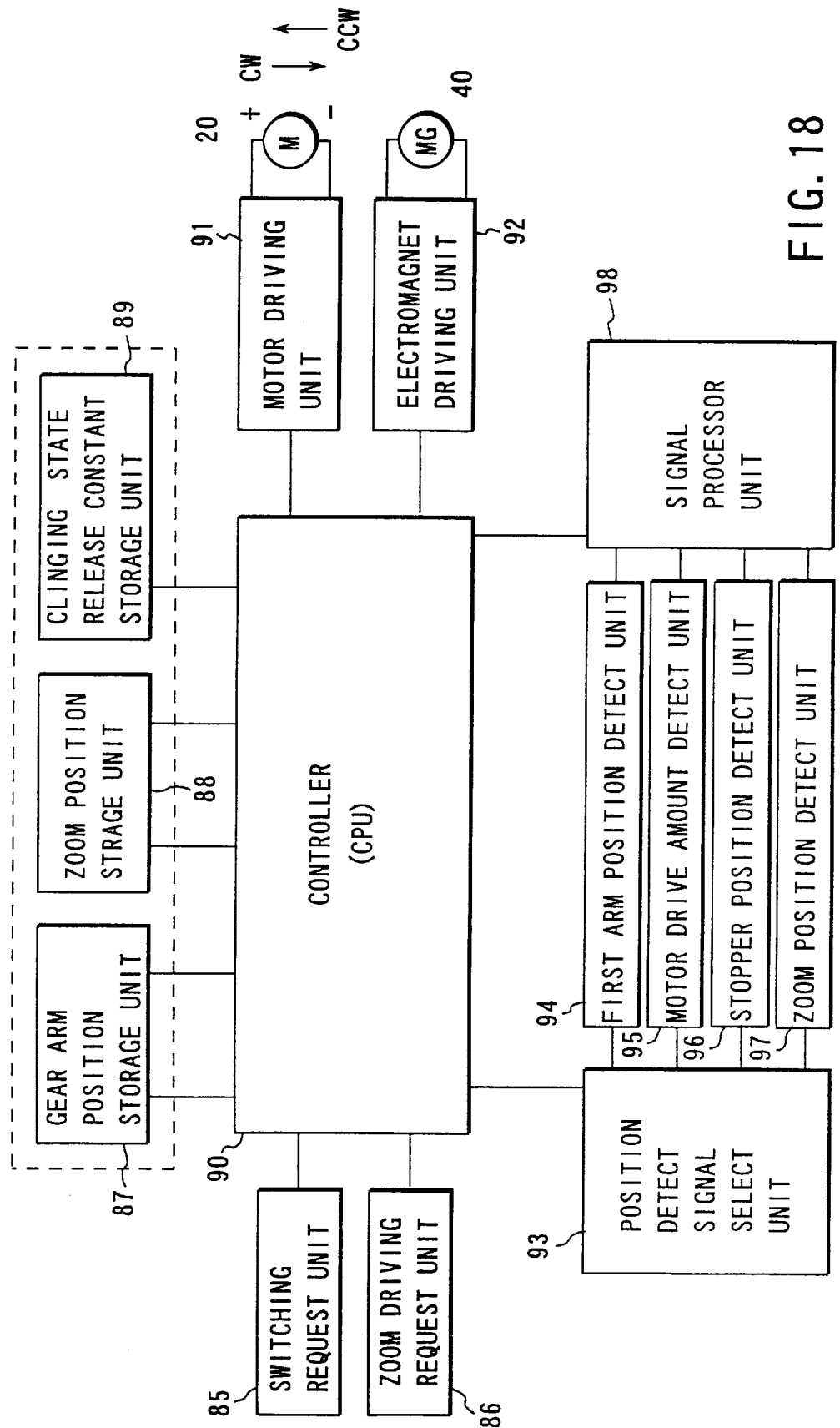
FIG. 18 is a block diagram of a controller for the camera driving mechanism in the embodiment.

FIG. 18 is a block diagram of a control unit in the driving unit, namely, the gear coupling unit, of the camera of the present embodiment.

A switching request unit 85, one of key components of the control device, receives signals from external switches (for example, a zoom button, a power switch, a rewind switch, etc.) and signals from the camera body, such as a film end detect signal, a rewind termination signal, and so on, and provides signals to a controller 90 which indicate target positions in switching the gear driving system, such as a setup/setdown position, a zoom-up/zoom-down position, a film winding position, a film rewinding position, and so on.

A zooming request unit 86 likewise receives signals from the external switches and the camera body and provides signals for driving the lens barrel 83 of the camera. For example, upon detecting a signal indicating the power switch being turned ON, the request unit 86 outputs to the controller 90 a signal that makes a request for a setup operation to move the lens barrel 83 from its retracted position into the shooting position. Upon detecting the zoom button being moved, the unit outputs a signal that makes a request for a zoom-up or zoom-down operation depending on the direction in which the zoom button is operated. In addition, when a signal indicating the power switch being turned OFF or the film end being detected is detected, the unit outputs to the controller 90 a signal that makes a request to move the lens barrel from the shooting position into its retracted position.

A gear arm position storage unit 87 (coupling arm position storage unit) stores the current position of each of the first, second and third gear arms 32, 45 and 61 and updates the stored contents at the termination of each switching operation.

A zooming position storage unit 88 (driven part state storage unit) holds the current driven state and position of the lens barrel 83. For example, the storage unit stores information indicating which of the retracted position, the setup completion position, the WIDE-setting position, the TELE-setting position, and an intermediate position between the WIDE-setting and the TELE-setting position the lens barrel is set at. The current driven state of the lens barrel, such as zooming-up/zooming-down, being under retraction, or the like, is stored as a flag. The information is updated every time the lens barrel is driven.

A clinging release constant storage unit (engagement release constant storage unit) 89 stores constants for releasing the clinging state between each of the first, second and third gear arms 32, 45 and 61 and the corresponding one of the first, second and third stoppers 35, 41 and 72 in switching the gear position by driving the electromagnet (indicated by MG in FIG. 18). A plurality of constants are stored so that an appropriate one can be selected depending on the position of each of the gear arms 32, 45 and 61, the driving condition, and the position of the lens barrel 83.

The gear arm position storage unit 87, the zoom position storage unit 88 and the clinging release constant storage unit 89 holds their contents even when the power to the camera is turned OFF. Use is made of, for example, EEPROM as storage means.

The controller 90, consisting of a central processing unit (CPU) by way of example, responds to signals from the switching request unit 85 and the zooming request unit 86 to perform the following processes:

When receiving a signal from the switching request unit 85, the controller makes a comparison between a switching position in the camera driving device and the current arm position in the camera driving device stored in the gear arm position storage unit 87 and then makes a decision of whether to switch the gear driving system in the camera driving device. When the switching is performed, the controller switches the camera driving device to the specified switching position.

When receiving a signal from the zooming request unit 86, in order to perform zoom-up/zoom-down or setup/setdown as requested, the controller drives the motor 20 as a reversible driving source or the electromagnet 40 (see FIG. 4, etc.) and switches among position detect units 94 to 97.

In driving the electromagnet 40 for switching the gear position, the controller selects from the clinging release constant storage unit 89 an appropriate constant for releasing the currently clinging gear arm and stopper from each other on the basis of the zoom information stored in the zoom position storage unit 88 and the gear positions stored in the gear arm storage unit 87 and then releases the clinging state of the gear arm and the stopper.

At the termination of the switching operation and the zooming operation, the controller writes the switched gear arm position information into the gear arm position storage unit 87 and the zooming state and the position of the lens barrel into the zoom position storage unit 88.

A motor driving unit 91 drives the motor (indicated as M in FIG. 18) 20 in the CW direction or the CCW direction in accordance with the direction of current flow.

An electromagnet driving unit 92 drives the electromagnet 40 in order to switch the gear position.

A first arm position detect unit 94 detects the position of the first gear arm 32 to determine whether the first gear arm 32 is positioned on the zoom/wind side (that is, the first planetary gear 31 is positioned in mesh with the gear 36; see FIG. 8A) or on the set/rewind side (that is, the first planetary gear 31 is positioned in mesh with the third sun gear 60; see FIG. 9A). This detect unit corresponds to the clutch PI 34.

When the first gear arm 32 is positioned on the zoom/wind side, the clutch PI 34 turns OFF (light is blocked). On the other hand, when it is positioned on the set/rewind side, the clutch PI turns ON (light is allowed to pass through).

A motor driving amount detect unit 95 outputs pulses corresponding to the amount by which the motor 20 is driven. For example, the detect unit 95 comprises a photo-interrupter (PI) directly coupled to the motor 20 and is hereinafter referred to as motor PI.

A stopper position detect unit 96 detects the position of each of the first, second, and third stoppers 35, 41, and 72 and corresponds to the stopper PI 46 in FIG. 8A. The stopper PI 46 turns OFF when any one of the first, second and third stoppers 35, 41 and 72 is lifted and turns ON when all of them go down.

A zoom position detect unit 97 detects the position of the lens barrel 83 and corresponds to the reset PR 84 in FIG. 15. The reset PR 84 turns ON when the silver seal 83b or 83c put on the lens barrel is positioned immediately under it, at which time light emitted by the reset PR is reflected by the silver seal. When neither of the silver seals 83b and 83c is positioned under the reset PR 84, it turns OFF (see FIGS. 15, 16, and 17).

In the above example, each of the detect units 94 to 97 comprises either a photointerrupter (PI) or photoreflector (PR). This is not restrictive. For example, detect switches may be used. Further, any type of sensor may be used, provided that it can detect the position of a moving member.

A position detect signal select unit 93 is responsive to the controller 90 to capture selectively output signals of the detect units 94 to 97. The select unit 93 and the motor driving amount detect unit 95 constitute a motor drive signal output unit.

A signal processing unit 98 processes outputs of the detect units 94 to 97 to provide the current driving information of the first, second and third gear arms 32, 45 and 61, the current states of the first, second and third stoppers 35, 41 and 72, the current position of the lens barrel 83, and the current amount of zoom driving.

Figure 19:
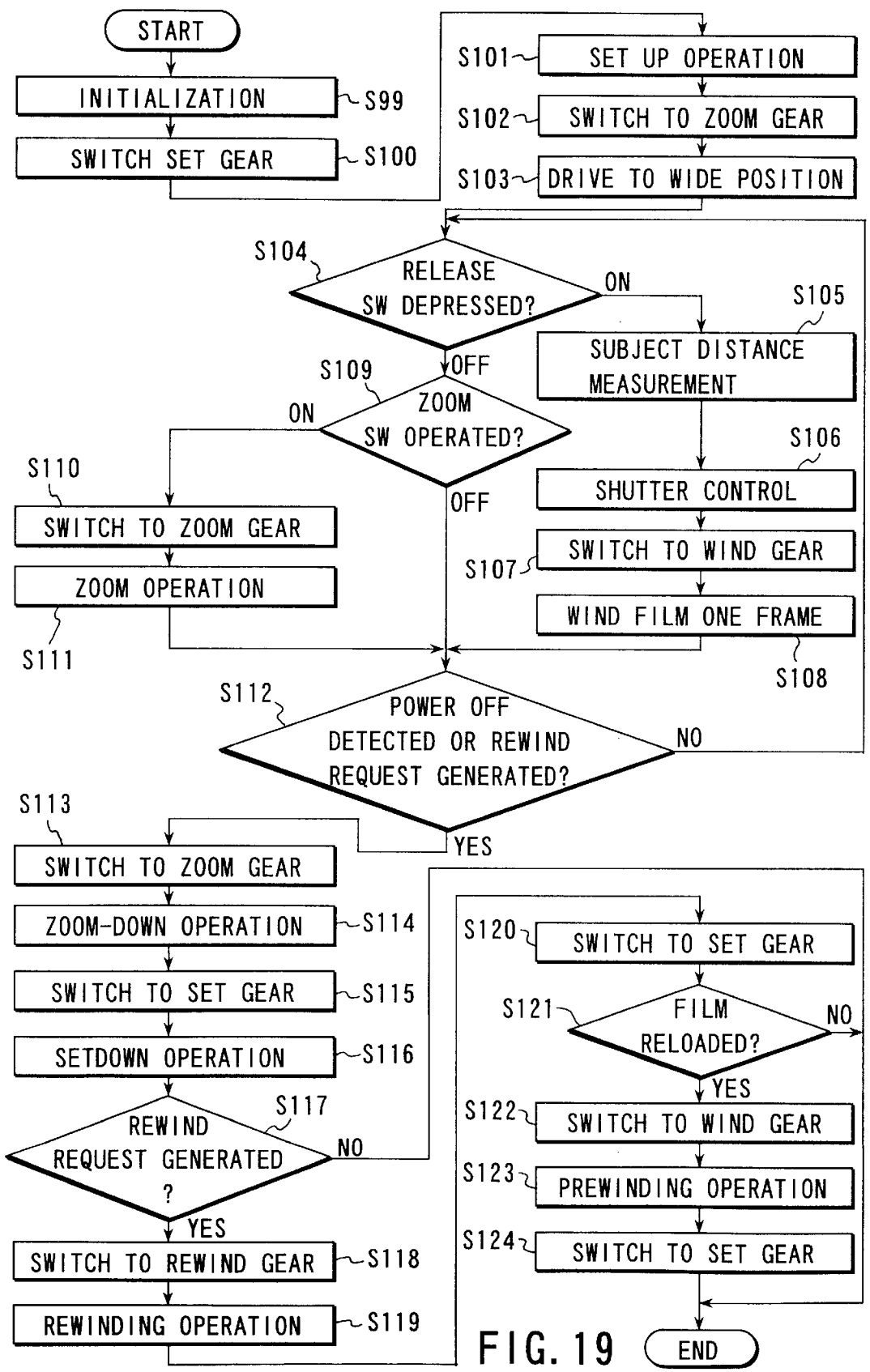

Referring now to FIG. 19 there is illustrated a flowchart of the shooting sequence including drive control after the power to the camera is turned ON.

Hereinafter, this flowchart will be described as a film having been already loaded into the camera.

As described previously, the output gears in the driving system have the following functions: When rotated in the CW direction, the rewind gear 51 in FIG. 8A rewinds film into the cassette. When rotated in the CW direction, the set gear 48 drives the lens barrel 83 into a setup operation; otherwise, it drives the lens barrel into a setdown operation. When rotated in the CCW direction, the zoom gear 65 drives the lens barrel 83 into a zoom-down operation; otherwise, its drives the lens barrel into a zoom-down operation. When rotated in the CCW direction, the wind gear 70 winds the film.

In the power-OFF state of the camera, the first gear arm 32 is on the set/rewind side, namely, in the position that permits the planetary gear 31 to mesh with the gear 36. The second gear arm 45 is in the position that permits the planetary gear 47 to mesh with the set gear 48. The third gear arm 61 is in the position that permits the planetary gear 62 to mesh with the zoom gear 65. The lens barrel 83 containing the picture taking lens is housed within the camera body, namely, retracted (see FIG. 15).

Information concerning these states is stored in the gear arm position detect unit 87 and the zoom position detect unit 88.

Hereinafter, the driving control of the camera will be described with reference to the flowchart of FIG. 19.

When the camera power switch is turned ON, initialization is performed which involves initialization of the controller (CPU) 90, checking the supply voltage, reading in EEPROM data, and so on (step S99).

In order to move the lens barrel 83 from the retracted position into the shooting position, the set gear 48 is switched into the meshed state so that it can be driven (see FIG. 8A; step S100). However, since, as described above, the set gear 48 has already meshed with the planetary gear 47, this switching operation needs not to be performed anew.

In subsequent step S100, a setup operation is performed to move the lens barrel 83 from its housed position in FIG. 15 to its shooting position in FIG. 16.

At this point, in the event of a failure to set up the lens barrel, an abnormal operation is considered to have occurred and then error processing is performed to make a jump to the damage process, in which the operation of the camera is stopped, the occurrence of an error is displayed, and a selected error code is written into the error history storage unit 6 in accordance with the previously described procedure. The error history storage unit is thus updated.

Figure 30:
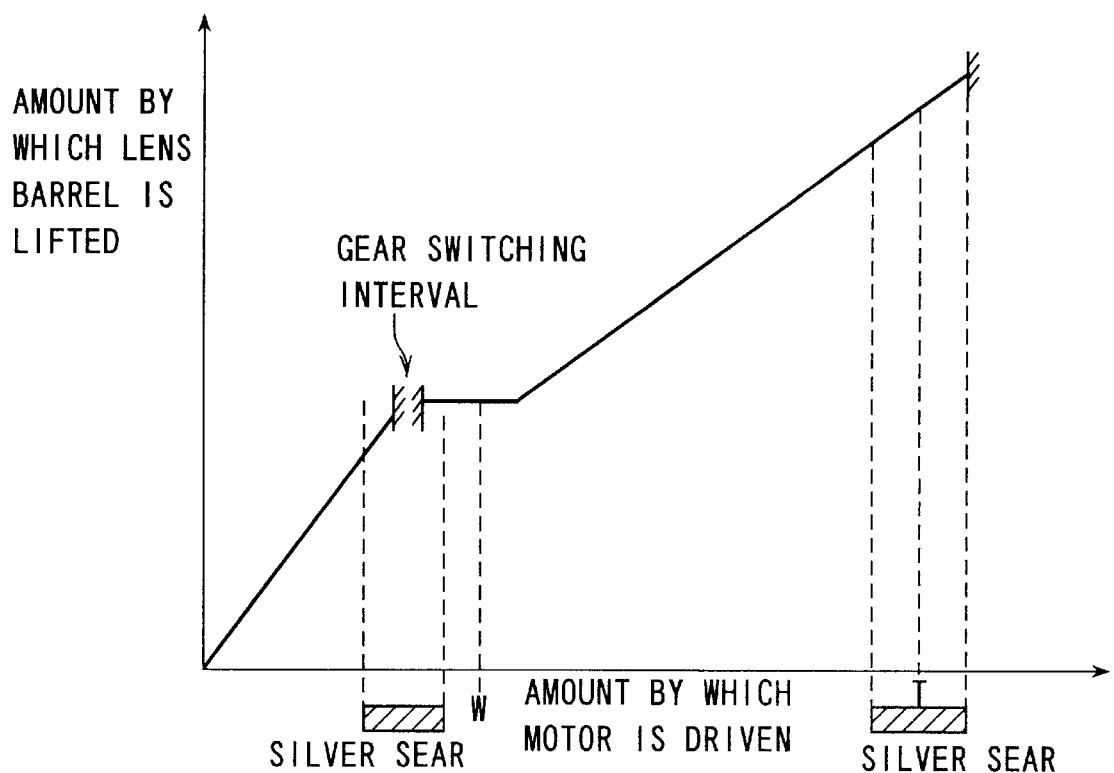
FIG. 30 illustrates a relationship in the zoom facility between the amount by which the lens barrel is moved and the amount by which the motor is driven.

In this setup processing, as shown in FIG. 30, with the motor PI and the reset PR 84, namely, the motor driving amount detect unit 95 and the zoom position detect unit 97, selected, the motor 20 is driven in the CW direction to move the lens barrel 83 forward until the reset PR 84 switches its output signal from OFF to ON and then the motor PI ceases its output.

At the termination of the setup operation, the position information stored in the zoom position storage unit 88 is rewritten from the retracted state into the setup completed state (the shooting state). The driving information is written such that the camera is in zoom-up operation.

After the termination of the setup control, a zoom gear switching process is performed to switch the gear driving system into the state in which the zoom gear 65 for zoom-up/zoom-down can be driven (step S102). This operation switches the first gear arm 32 from the set/rewind side to the zoom/wind side (see FIG. 9A).

The lens barrel 83 is driven into the WIDE setting position to reach the state where shooting is possible (step 103). The WIDE setting position is then stored in the zoom position storage unit 88 as the position information of the lens barrel 83.

Subsequently, a variety of processing is performed in response to switch inputs of the camera. First, a decision is made as to whether the release switch is depressed or not (step S104). When a release switch ON signal is detected, shooting and winding the film one frame are performed in steps S105 to S108.

That is, the subject distance is measured in step S105, and the autofocus (AF) lens is moved forward based on the measured data and then the shutter is opened to expose the film (step S106).

After the exposure, the gear driving system is switched from the state where it meshes with the zoom gear 65 to the state where it meshes with the wind gear 70 (step S107). This operation switches the third gear arm 61 from the zoom side to the wind side (see FIG. 10A).

After the termination of the switching operation, the motor 20 is driven in the CCW direction while detecting the amount of film movement using a film movement amount detecting photoreflector (hereinafter referred to as WPR) not shown, thereby winding the film by one frame (step S108).

When, in step S104, the operation of the release switch is not detected, a decision is made as to whether or not the zoom-up/zoom-down switch (zoom switch) has been operated (step S109).

When the zoom switch has been detected, the procedure then goes to steps S110 and S111. That is, although the gear driving system at this point is placed in the state where the wind gear 70 can be driven (see FIG. 10A), when the zoom switch is operated, the gear driving system is switched from the state where it meshes with the wind gear 70 to the state where the zoom gear 65 can be driven (step S110). In this case, the third gear arm 61 is switched from the wind side to the zoom side, that is, into the state where the planetary gear 62 meshes with the zoom gear 65 (see FIG. 9B).

When the zoom-up switch in the zoom switch is depressed, the motor 20 is rotated in the CCW direction to perform a zoom-up operation. On the other hand, when the zoom-down switch is depressed, the motor 20 is rotated in the CW direction to perform a zoom-down operation. In this case, the motor continues to be driven until the zoom switch is turned OFF or the TELE/WIDE setting position is reached (step S111).

At this time, in the zoom position storage unit 88 are stored WIDE setting position information, TELE setting position information, intermediate position information between the WIDE and TELE setting positions, and zoom-up/down information in accordance with the ON/OFF state of the zoom switch.

When either step S108 or step S111 is terminated or the zoom switch is OFF in step S109, a decision is made in step S112 as to whether the power switch having being turned OFF, the film end having been detected, or the rewind switch having been turned ON is detected or not. When none of them is detected, the procedure returns to step S104 to repeat the above operation; otherwise, the procedure goes to steps S113 to S116 to perform a process of retracting the lens barrel 83.

First, the gear driving system is switched into the state where it meshes with the zoom gear 65 (step S113). If, in this case, the zoom gear 65 has already been in the meshed state at the time of the decision in step S104, then step S113 is not particularly performed.

Subsequent to step S113, the motor is driven in the CW direction until the lens barrel 83 reaches its retractable position (the state of FIG. 16). A zoom-down operation is performed until the motor PI ceases producing its output (step S114).

At the termination of the zoom-down operation, in order to retract the lens barrel 83, the gear driving system is switched from the state where it meshes with the zoom gear 65 to the state where it meshes with the set gear 48 (step S115). In this case, the first gear arm 32 is switched from the wind/zoom side to the set/rewind side so that the planetary gear 31 meshes with the gear 36 (the state of FIG. 8A). When this state is reached, the motor 20 is driven in the CW direction to retract the lens barrel 83 (step S116). At the completion of the retraction of the lens barrel, the information in the zoom position storage unit 88 is rewritten from the setup complete state to the retracted state.

A decision is then made in step S117 as to whether a request for rewinding has occurred. The request is generated by detecting the film end when the film is wound or depressing the rewind switch. In the absence of such a request, the procedure is terminated without any process.

In the presence of such a request, on the other hand, in order to rewind the film, the gear driving system is switched from the state where it meshes with the set gear 48 from the state where the rewind gear 51 can be driven (step S118). More specifically, the second gear arm 45 is rotated to cause the planetary gear 47 to get out of the set gear 48 and then mesh with the gear 49 in the rewind gear system (see FIG. 10B).

Upon detecting that the planetary gear 47 has meshed with the gear 49, the motor 20 is driven in the CW direction to rewind the film until the WPR ceases producing its output (step S119).

Upon completion of the film rewinding, the gear driving system is switched so that it meshes with the set gear 48 (step S120). That is, the second gear arm 45 is rotated so that the planetary gear 47 gets out of the gear 49 and meshes with the set gear 48 (see FIG. 8).

Upon completion of the film rewinding, a decision is made in step S121 as to whether the user unloads the film and then loads a new film into the camera. When no film is loaded again, the procedure is terminated without any process.

When a new film is loaded, on the other hand, subsequent steps S122 to S124 are carried out for prewinding.

That is, upon detecting that a film has been loaded again into the camera, in order to wind the film, the gear driving system is switched so that it meshes with the wind gear 70 (step S122). The first gear arm 32 is first switched from the set/rewind side to the zoom/wind side and the third gear arm 61 is then switched from the zoom side to the wind side.

After this switching operation, the motor 20 is rotated in the CCW direction while referencing the WPR output, thereby performing prewinding by which the film is wound by a given number of frames (step S123).

At the termination of the prewinding, the gear driving system is switched so that it meshes with the set gear 48 (step S124). That is, the third gear arm 61 is first switched from the wind side to the zoom side and the first gear arm 32 is then switched from the zoom/wind side to the set/rewind side. Thus, the procedure is terminated.

Next, the process of controlling the switching operations invoked in the shooting sequence of FIG. 19 will be described in detail.

Figure 20:
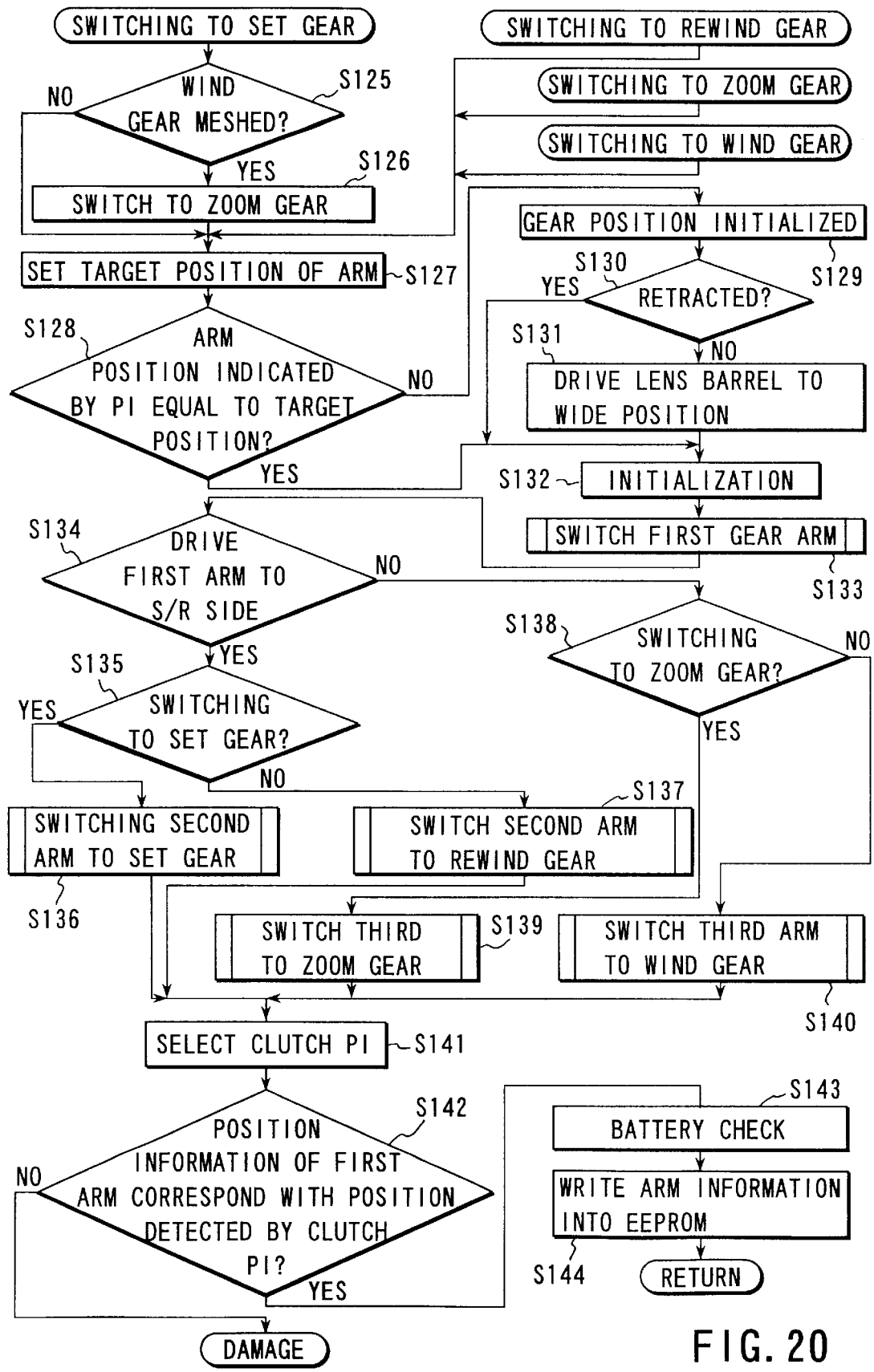
FIG. 20 is a flowchart illustrating a process of switching among gears which is invoked in the photographing sequence of FIG. 19.

FIG. 20 shows the flow of the gear switching control.

As described in connection with FIG. 19, when an instruction is given to switch each of the output gears of the set gear, the rewind gear, the zoom gear, and the wind gear into its drivable state, a routine shown in FIG. 20 is invoked.

The driving target positions of each of the gear arms 32, 45 and 61 are set (step S127).

First, to switch the set gear 48 into its drivable state, the target position of the first arm gear 32 is set to the position in which it is rotated to the set/rewind side, namely, it meshes with the gear 36. For the second gear arm 45, its target position is set to the position in which it is rotated up to the state where it meshes with the set gear 48. For the third gear arm 61, its target position is set to the position in which it is rotated up to the state where it meshes with the zoom gear 65.

Moreover, to switch the zoom gear 65 into its drivable state, the target position of the first arm gear 32 is set to the position in which it is rotated to the zoom/wind side, namely, it meshes with the third sun gear 60. For the second gear arm 45, its target position is set to the position in which it meshes with the set gear 48. For the third gear arm 61, its target position is set to the position in which it meshes with the zoom gear 65.

Finally, to switch the wind gear 70 into its drivable state, the target position of the first arm gear 32 is set to the position in which it is rotated to the zoom/wind side, namely, it meshes with the third sun gear 60. For the second gear arm 45, its target position is set to the position in which it meshes with the set gear 48. For the third gear arm 61, its target position is set to the position in which it meshes with the wind gear 70.

If, in switching the set gear 48 into the meshed state, the gear trains presently meshes with the wind gear 70, then the zoom gear 65 first has to be switched into the meshed state (steps S125 and S126).

After the target setting in step S127, current arm positions stored in the gear arm position storage unit 87 in the EEPROM are compared with actual arm positions measured by the two position detectors: the stopper PI 46 and the clutch PI 34 (step S128).

That is, the states currently stored in the EEPROM must be such that:

For switching to the set gear 48 side, the clutch PI 34 is in the ON state and the stopper PI 46 is in the ON state.

For switching to the rewind gear 51 side, the clutch PI 34 is in the ON state and the stopper PI 46 is in the OFF state.

For switching to the zoom gear 65 side, the clutch PI 34 is in the OFF state and the stopper PI 46 is in the ON state.

For switching to the wind gear 70 side, the clutch PI 34 is in the OFF state and the stopper PI 46 is in the ON state.

If the stored arm position information does not correctly correspond with the states of the PIs 34 and 46, then the gear meshed state is initialized so that the set gear 48 is placed in the meshed state and the lens barrel 83 is retracted (step S129).

After that, a decision is made in step S130 as to whether the lens barrel 83 is in the retracted state or not. If the lens barrel is in the shootable state before the initialization of the gear driving system, then the lens barrel is moved to the WIDE setting position (step S131).

After the termination of step S131 or when the decision in step S130 is that the lens barrel 83 is in the retracted state, initialization is performed which involves initializing RAM data necessary for control and setting interruptions (step S132).

Subsequently, when switching the gear driving system to the set gear 48 side or the rewind gear 51 side, control is performed to switch the first gear arm 32 from the zoom/wind side to the set/rewind side. On the other hand, in switching the gear driving system from the zoom gear 65 to the wind gear 70, control is performed to switch the first gear arm 32 from the set/rewind side to the zoom/wind side (step S133).

After the termination of switching of the first gear arm 32, the second gear arm 45 or the third gear arm 61 are rotated to mesh with their respective target gear.

A decision is then made in step S134 as to which of the set/rewind side and the zoom/wind side the first gear arm 32 has been switched to.

If the target position of the first gear arm 32 is the switching position to the set/rewind (S/R) side, then a decision is made in step S135 as to which of the set gear 48 and the rewind gear 51 switching is to be made to.

When switching is to be made to the set gear 48, the second gear arm 45 is rotated up to the position in which it meshes with the set gear (step S136). On the other hand, when switching is to be made to the rewind gear 51, the second gear arm 45 is rotated up to the position where it meshes with the gear 49 (step S137).

On the other hand, when the target position of the first gear arm 32 is the switching position to the zoom/wind side, the third gear arm 61 is controlled to rotate up to the position in which the third arm 61 meshes with the zoom gear 65 or the wind gear 70 (steps S138, S139 and S140).

The operations thus far bring the gear switching control to completion.

When the second or third gear arm 45 or 61 is being switching controlled, a shock to the camera may move the first gear arm 32, in which case a malfunction will occur after gear switching. In such case, a check is made to ensure that the rewritten position information of the first gear arm 32 corresponds with the state detected by the clutch PI 34 (steps S141 and S142).

In the event that the position information of the first gear arm 32 differs from the state detected by the clutch PI 34, an abnormal operation is considered to have occurred. As a result, a jump is made to the damage process as an error process, which stops the operation of the camera, displays that an error has occurred, and writes a selected error code into the error history storage unit 6 in accordance with the previously described procedure. The storage unit 6 is thus updated.

On the other hand, when the information comparison indicates coincidence in step S142, a battery check is made in step S143 and the last state of the gear train is written into the EEPROM in step S144, thereby terminating the procedure.

Figure 21:
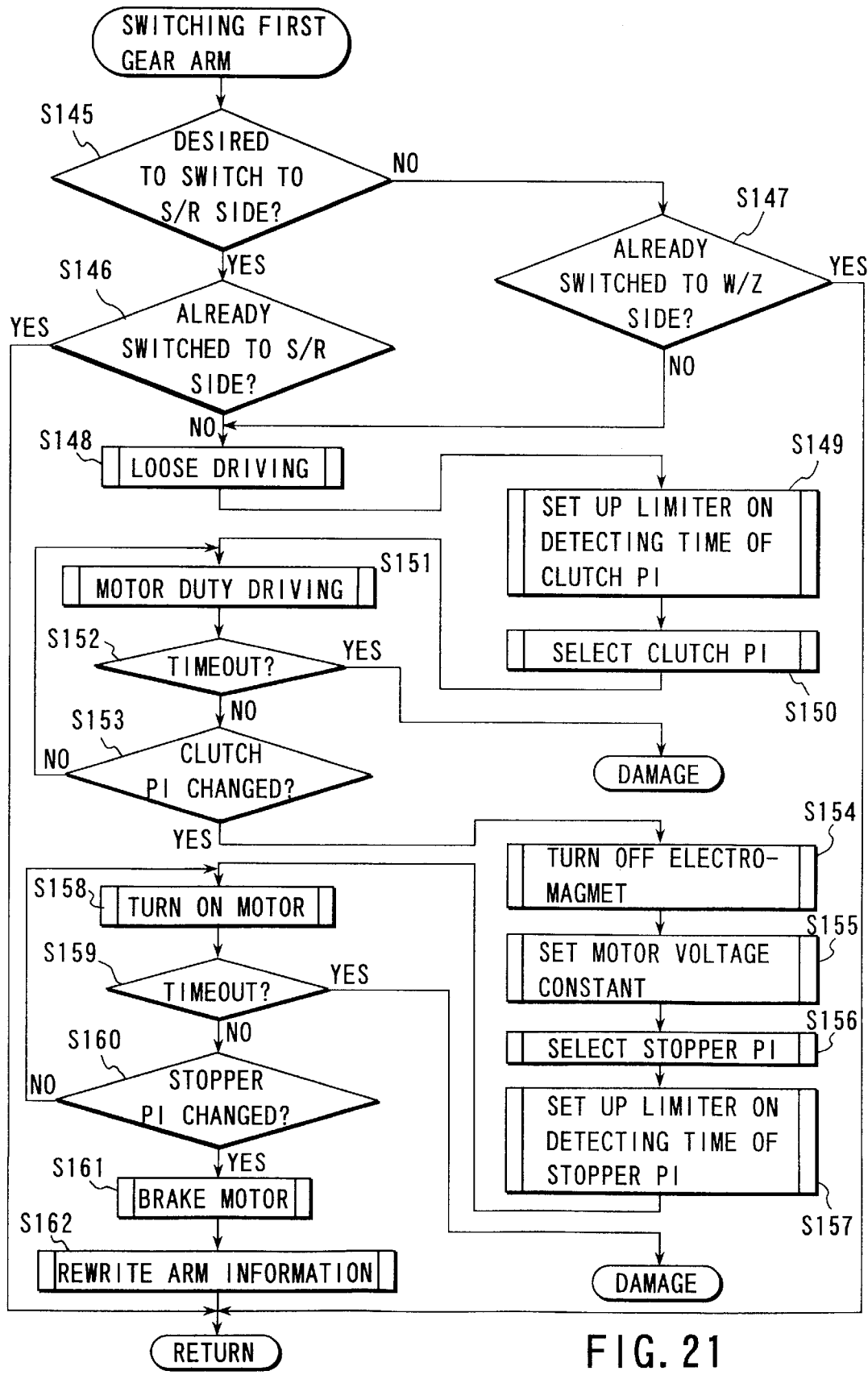
FIG. 21 is a flowchart illustrating a first gear arm switching process invoked in a subroutine in FIG. 20.

FIG. 21 is a flowchart illustrating the switching control of the first gear arm 32 in the subroutine called in step S133 of FIG. 20.

If, when it is desired to switch the first gear arm 32 to the S/R side, it has already been positioned to the S/R side, or if, when switching the first gear arm 32 to the W/Z side, it has already been positioned to the W/Z side, the switching is no longer needed and the routine is therefore terminated without any process (steps S145, S146 and S147).

In other conditions than the above, the first gear arm 32 needs to be rotated. As described previously, the first gear arm is locked by the first stopper 35. In order to rotate it, therefore, it is required to turn the electromagnet 40 ON to withdraw the first stopper.

Thus, loose driving is performed to withdraw the first stopper 35 (step S148). Depending on operating conditions of the camera prior to gear switching, the gears are in various states.

When the first gear arm 32 is positioned on the set/rewind side, the first stopper 35 and the first gear arm 32 will cling to each other after the motor 20 is driven in the CCW direction, whereas the second stopper 41 and the second gear arm 45 will cling to each other after the motor is driven in the CW direction.

When the first gear arm 32 is positioned on the zoom/wind side, the third stopper 72 and the third gear arm 61 will cling to each other after the motor 20 is driven in the CCW direction, whereas the first stopper 35 and the first gear arm 32 will cling to each other after the motor is driven in the CW direction.

To release such a clinging state, the motor 20 is first driven in a direction that releases the clinging state of the second gear arm 45 or the third gear arm 61 until a given number of pulses is detected by the motor PI.

This direction in which the motor is driven coincides with the direction that causes the first gear arm to cling to the first stopper. Thus, the motor is driven next until the motor IP detects the number of pulses that releases the clinging state of the first gear arm 32.

It is required to define the number of pulses that releases the clinging state so as to satisfy a relationship such that the number of pulses for the second gear arm 45 or third gear arm 61>the number of pulses for the first gear arm.

An appropriate number of pulses that releases the clinging state is selected from the clinging release constant storage unit 89 according to the operating conditions of the camera and the gear positions. The selection of the number of pulses and their types will be described later.

After the motor is driven by a given number of pulses, the electromagnet 40 is turned ON with a full voltage to withdraw the third stopper 72. When the third stopper is withdrawn, the stopper PI 46 is placed in the OFF state. After the detection of the OFF state, the drive voltage of the electromagnet 40 is switched to a minimum hold voltage.

In this state, the first stopper 35 have been withdrawn with certainty, allowing the first gear arm 32 to rotate (see FIGS. 11A and 11B).

Subsequently, a limiter is set up on the detecting time of the clutch PI 34 (step S149) and the clutch PI 34 is selected as means for detecting the position of the first gear arm 32 (step S150). Thus, the clutch PI is set so that its ON/OFF state can be detected.

In step S147, when switching the first gear arm 32 from the set/rewind side to the zoom/rewind side, the motor 20 is driven in the CCW direction. In step S146, when switching the first gear arm from the zoom/wind side to the set/rewind side, the motor is driven in the CW direction. In either case, until the state of the clutch PI 34 changes the motor 20 is duty-driven so that ON and OFF are repeated at regular intervals (step S151).

A decision is then made in step S152 as to whether a predetermined period of time has elapsed. In the event that no change is detected in the state of the clutch PI 34 even after the lapse of the predetermined period of time, an abnormal operation is considered to have occurred. In such case, a jump is made to the damage process as an error process, by which the operation of the camera is stopped, the occurrence of an error is displayed, and a selected error code is written into the error history storage unit 6 in accordance with the previously described procedure. The storage unit 6 is thus updated.

Within the predetermined period of time, whether the state of the clutch PI 34 has changed is detected (step S153). If there is no change, then the procedure returns to step S151.

When a change in the state of the clutch PI 34 is detected, on the other hand, the electromagnet 40 is turned OFF (step S154) and the drive voltage of the motor 20 is set to a predetermined value (step S155).

Even if the electromagnet 40 is turned OFF, the first stopper 35 is in the state in which it rides the first gear arm 32 as shown in FIG. 14B. Thus, the stopper PI 46 remains in the OFF state (light is blocked).

Therefore, the position detect signal select unit 93 is switched from the first arm position detect unit 94, or the clutch PI 34, to the stopper position detect unit 96, or the stopper PI 46 (step S156). A limiter is set up on the detecting time of the stopper PI 46 (step S157) and the motor 20 is started in the same direction as above (step S158).

A decision is then made in step S159 as to whether a predetermined period of time has elapsed. If the decision is that the ON state of the stopper PI 34 is not detected even after the lapse of the predetermined period of time, an abnormal operation, such as a mistake in gear switching, is considered to have occurred. In such case, a jump is made to the damage process as an error process, by which the operation of the camera is stopped, the occurrence of an error is displayed, and a selected error code is written into the error history storage unit 6 in accordance with the previously described procedure. The storage unit 6 is thus updated.

Within the predetermined period of time, whether the stopper PI 46 has fallen is detected (step S160). If no fall is detected, then the procedure returns to step S151.

When the fall of the stopper PI 46 is detected, the gear switching terminates and the motor 20 is thus braked (step S161).

After making sure that the motor 20 has stopped, the information concerning the first gear arm 32 is updated so as to describe that its switching has been terminated (step S162). The routine is then terminated.

Figure 22:
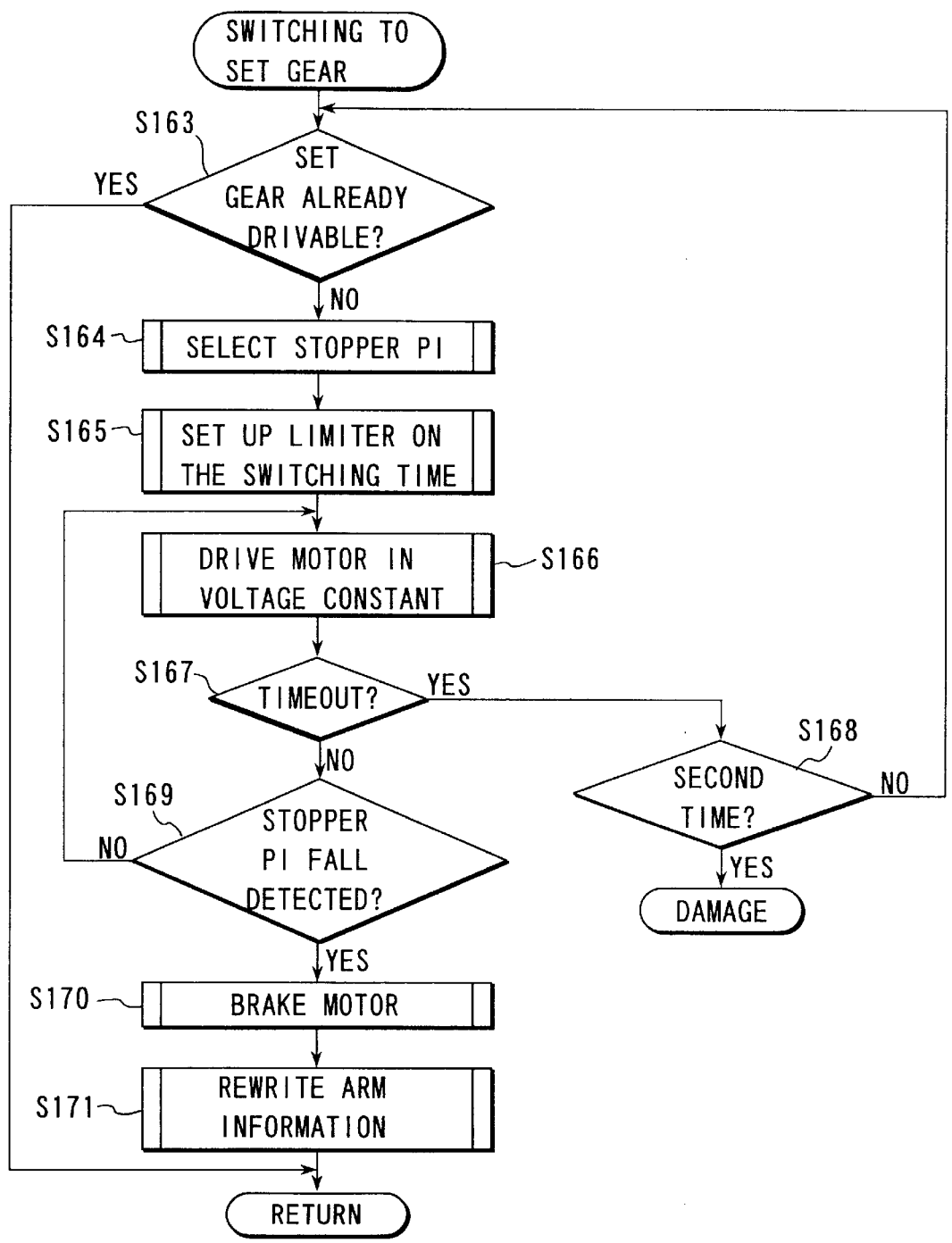
FIG. 22 is a flowchart illustrating a second gear arm switching process invoked in a subroutine in FIG. 20.

FIG. 22 is a flowchart illustrating the routine, called in step S136 of FIG. 20, of switching the second gear arm 45 from the rewind position into the set position (switching from the state of FIG. 13B to the state of FIG. 8A).

First, in switching the second gear arm 45 into the state where it meshes with the set gear 48, a decision is made in step S163 as to whether the second gear arm 45 has already been positioned in mesh with the set gear 48. If the second gear arm is positioned so (YES), then the routine is terminated without doing anything (the state of FIG. 8A).

On the other hand, if the second gear arm 45 is positioned in mesh with the gear 49 in the rewind system (NO), then the stopper PI 46, which is in the OFF state, is selected as position detecting means.

Next, a guard timer (limiter) is set up on the switching time (step S165).

The motor 20 is then driven in the CCW direction with a fixed voltage (step S166), whereby the second gear arm 45 is driven in the CCW direction.

A decision is then made in step S167 as to whether a predetermined period of time has elapsed. If a fall of the stopper PI 46 (a change from the OFF state to the ON state) is not detected within the predetermined period of time, then a switching failure is considered to have occurred. A decision is then made in step S168 as to whether the failure is the first one. If so, a return is made to step S163 for retry. If the failure is the second one, then an abnormal operation is considered to have occurred and then a jump is made to the damage process as an error process, by which the operation of the camera is stopped, the occurrence of an error is displayed, and a selected error code is written into the error history storage unit 6 in accordance with the previously described procedure. The storage unit 6 is thus updated.

When the predetermined period of time has not elapsed in step S167, a decision is made in step S169 as to whether a fall of the stopper PI 46 (a change from the OFF state to the ON state) has been detected. If NO, then a return is made to step S166.

When the fall of the stopper PI 46 is detected, the motor 20 is braked to a stop (step S170). Finally, the position information concerning the second gear arm 45 is updated (step S171) and the routine is then terminated.

Figure 23:
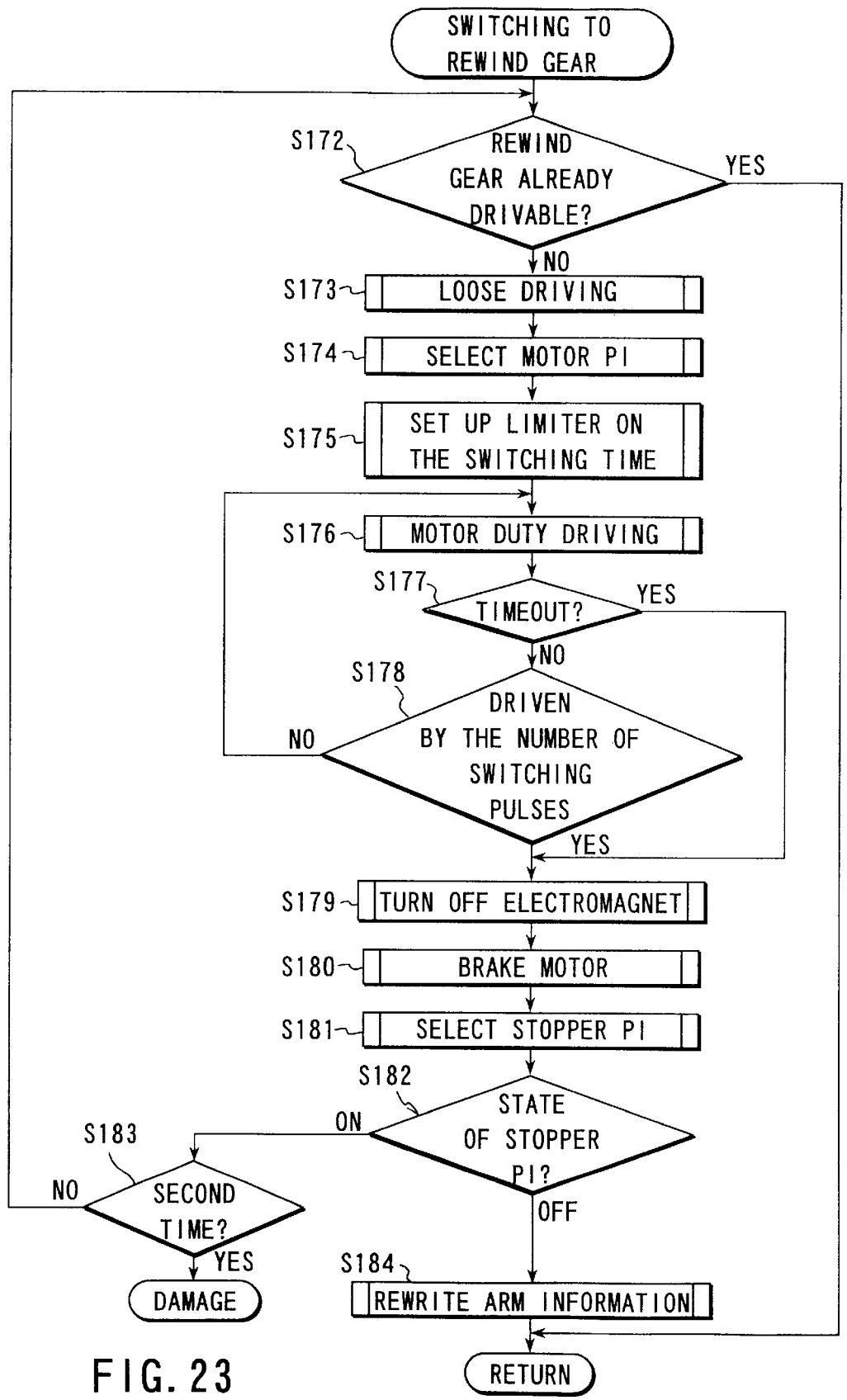
FIG. 23 is a flowchart illustrating a second gear arm switching process invoked in a subroutine in FIG. 20.

FIG. 23 is a flowchart illustrating the routine of switching the second gear arm 45 from the set position into the rewind position (switching from the state of FIG. 8A to the state of FIG. 13A), which is called in step S137 of FIG. 20.

First, in switching the second gear arm 45 into the position where it can drive the rewind gear 51, a decision is made in step S172 as to whether the second gear arm 45 has already been placed in the state where it can drive the rewind gear 51. If the second gear arm is positioned so (YES), then this routine is terminated without doing anything.

When the second gear arm 45 is not drivably positioned, the arm is required to be switched into the drivable state. At this point, however, the second gear arm is locked by the second stopper 41; therefore, it is required to release the second gear arm 45 by energizing the electromagnet 40. To this end, loose driving is carried out and the electromagnet 40 is turned ON to thereby turn the stopper PI 46 OFF.

That is, prior to execution of the loose operation, the second gear arm 45 and the second stopper 41 or the first gear arm 32 and the first stopper 35 are in engagement with each other. In order to release this engaged state, the motor 20 is first driven by the motor PI in the CCW direction by a predetermined number of pulses and next driven in the CW direction. The electromagnet 40 is then energized to detect the state of the stopper PI 46 (step S73).

After the detection of the OFF state of the stopper PI 46, the motor PI is selected as position detecting means to detect the amount by which the motor 20 has been driven (step S174).

Next, a limiter is set up on the time required to terminate the operation of switching to the rewind gear 51 (step S175).

With the electromagnet 40 turned ON, duty driving is carried out by which the power to the motor 20 is switched ON and OFF at regular intervals.

A decision is then made in step S177 as to whether a predetermined period of time has elapsed. If so, a jump is made to step S179; otherwise, a decision is made in step S178 as to whether or not the outputs of the motor PI corresponding in number to the switching pulses have been detected.

When the outputs of the motor PI does not reach the number of the switching pulses, a return is made to step S176. On the other hand, when it is detected that the motor 20 has been driven by the amount corresponding to the number of the switching pulses, the power to the electromagnet 40 is turned OFF (step S179) and the motor 20 is braked to a stop (step S180).

After the motor 20 has stopped, the stopper PI 46 is selected as position detecting means (step S181) and the state of the stopper PI is detected (step S182).

When the stopper PI 46 is ON, it is considered that the stopper has fallen in the middle of gear switching. A decision is then made in step S183 as to whether this is the second time. In the case of the first time, a return is made to step S172 to perform the switching operation again. In the case of the second time, an abnormal operation is considered to have occurred and then a jump is made to the damage process as an error process, by which the operation of the camera is stopped, the occurrence of an error is displayed, and a selected error code is written into the error history storage unit 6 in accordance with the previously described procedure. The storage unit 6 is thus updated.

When, in step S182, it is confirmed that the stopper PI 46 is OFF, the position information of the second gear arm 45 is updated (step S184), thereby terminating this routine.

Figure 24:
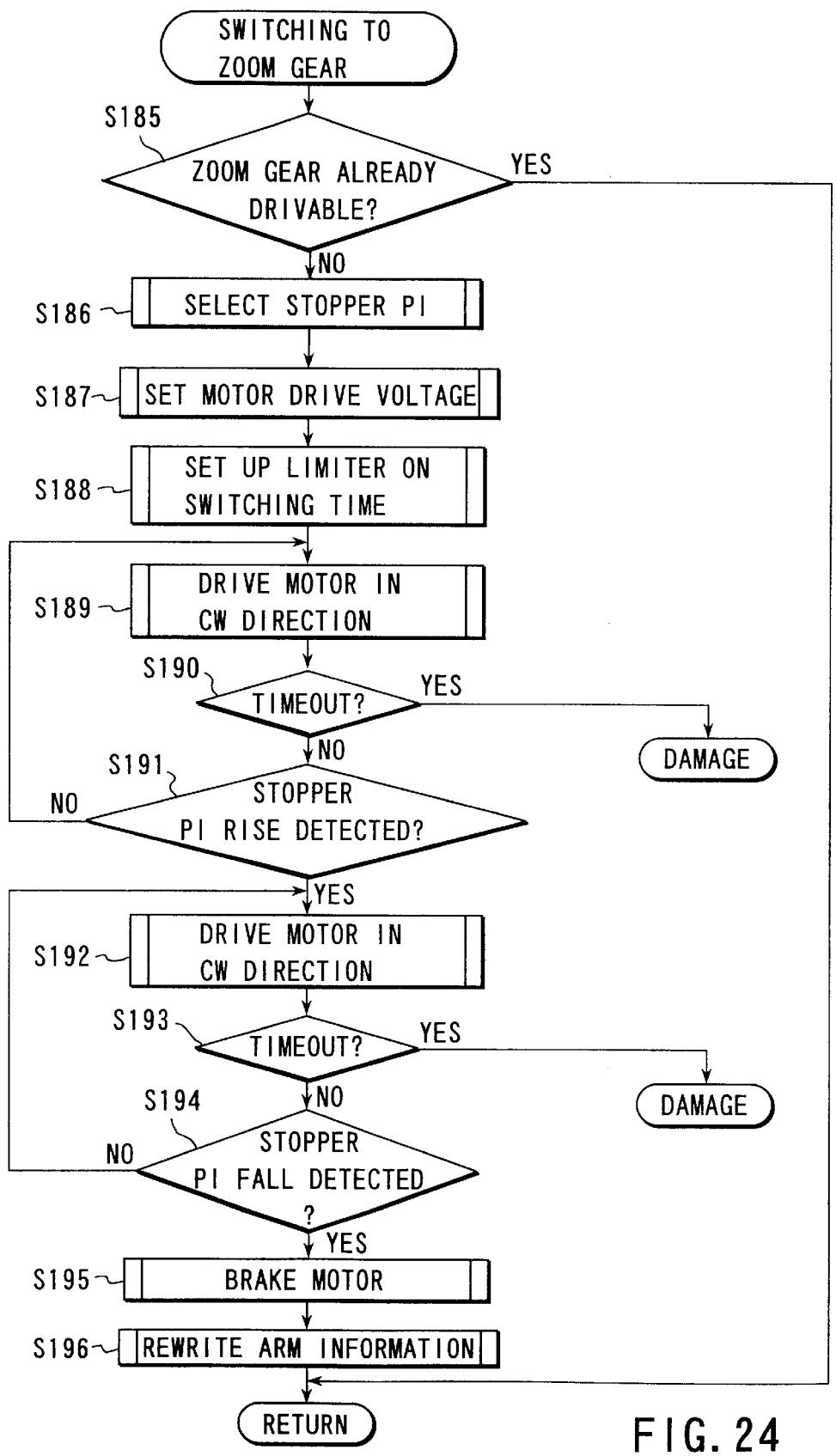
FIG. 24 is a flowchart illustrating a third gear arm switching process invoked in a subroutine in FIG. 20.
Figure 25:
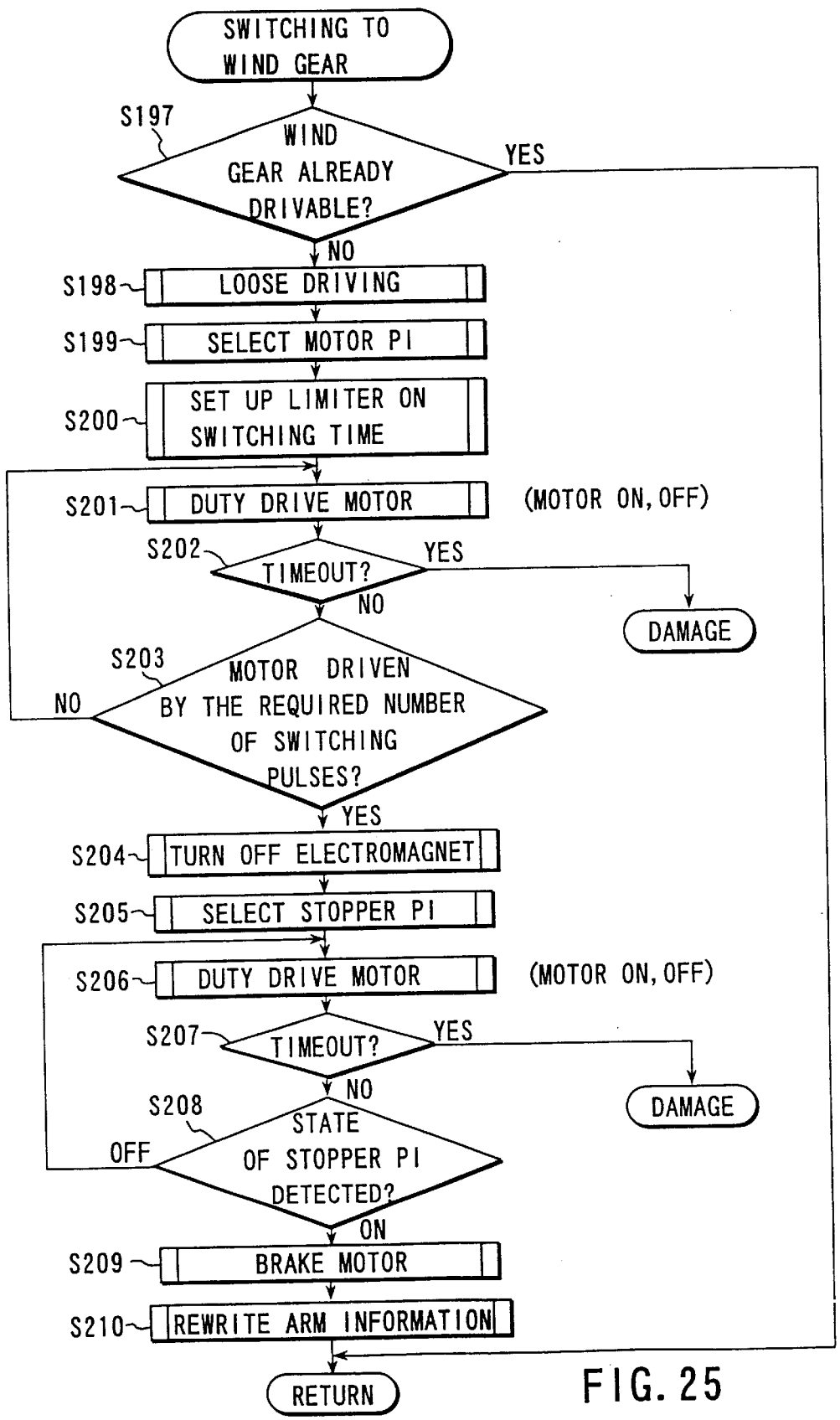
FIG. 25 is a flowchart illustrating a third gear arm switching process invoked in a subroutine in FIG. 20.

FIG. 24 is a flowchart illustrating the routine, called in step S139 of FIG. 20, of switching the third gear arm 61 from the wind position into the zoom position (switching from the state of FIG. 10A to the state of FIG. 9A).

In this operation, a decision is first made in step S185 as to whether or not the third gear arm 61 has been already positioned in mesh with the zoom gear 65. If so, this routine is terminated without doing anything.

If the third gear arm is not in mesh with the zoom gear, then the stopper PI 46 is selected as position detecting means (step S186) and the motor drive voltage is set for driving the third gear arm (step S187).

A limiter is then set up on the time required to switch the third gear arm 61 from the wind position into the zoom position (step S188).

The motor 20 is driven in the CW direction with the set drive voltage (step S188). A decision is then made in step S190 as to whether or not the limited time is reached. If the set time has been exceeded, then an abnormal operation is considered to have occurred and a jump is then made to the damage process as an error process, whereby the operation of the camera is stopped, the occurrence of an error is displayed, and a selected error code is written into the error history storage unit 6 in accordance with the previously described procedure. The storage unit 6 is thus updated.

Note that when the third gear arm 61 is positioned in mesh with the wind gear 70, the stopper PI 46 is in the ON state.

The driving of the motor 20 in the CW direction permits the third gear arm 61 to lift the third stopper 72. When the third gear arm 61 is rotated up to a predetermined position, a rise of the stopper PI 46 in which its state changes from ON (light is allowed to pass through) to OFF (light is blocked) is obtained.

Whether this rise has been obtained or not is detected (step S191). When the rise is not detected yet, a return is made to step S189.

When the OFF state of the stopper PI 46 is detected, the motor 20 is further driven in the CW direction (step S192).

A decision is then made in step S193 as to whether or not the set time is reached. If the set time has been exceeded, then an abnormal operation is considered to have occurred and a jump is then made to the damage process as an error process, whereby the operation of the camera is stopped, the occurrence of an error is displayed, and a selected error code is written into the error history storage unit 6 in accordance with the previously described procedure. The storage unit 6 is thus updated.

When the third gear arm 61 reaches the zoom gear 65, the stopper falls, obtaining a fall of the stopper PI 46 (a change from OFF to ON).

If the set time is not reached in step S195, then whether or not the fall has been obtained is detected (step S194). If it has not been detected, then a return is made to step S192.

When the fall of the stopper PI 46 has been detected, the motor 20 is braked to a stop (step S195).

Finally, the position information of the third gear arm 61 is updated (step S196), thereby terminating this routine.

FIG. 23 is a flowchart illustrating the routine of switching the third gear arm 61 from the zoom position into the wind position (switching from the state of FIG. 9A to the state of FIG. 10A), which is called in step S140 of FIG. 20.

First, in switching the third gear arm 61 into the position where it meshes with the wind gear 70, a decision is made in step S197 as to whether the third gear arm 61 has already been positioned in mesh with the wind gear 70. If the third gear arm is positioned so (YES), then this routine is terminated without doing anything.

When the third gear arm is not in mesh with the wind gear yet, it is being locked by the third stopper 72 so that it cannot be switched into the position to mesh with the wind gear even if the motor 20 is driven in the CCW direction. In order to switch the third arm gear 61 from the zoom position into the wind position, therefore, it is required to unlock the third gear arm 61 by energizing the electromagnet 40. To this end, the electromagnet 40 is turned ON by loose driving and the OFF state of the stopper PI 46 is detected (step S198).

Prior to execution of the loose driving, the third gear arm 61 and the third stopper 72 or the first gear arm 32 and the first stopper 35 are in engagement with each other. In order to release this engaged state, the motor 20 is first driven in the CCW direction by a predetermined number of pulses that the motor PI produces and next driven in the CW direction.

After the detection of the OFF state of the stopper PI 46, the motor PI is selected as position detecting means to detect the amount by which the motor 20 has been driven (step S199).

Next, a limiter is set up on the time required for the third arm gear 61 to switch from the zoom position into the wind position (step S200).

With the electromagnet 40 energized, duty driving is carried out by which the power to the motor 20 is switched ON and OFF at regular intervals.

A decision is then made in step S202 as to whether the predetermined period of time set in step S200 has elapsed. When no switching termination pulse is output within the predetermined period of time, it is decided that the gear switching ended in failure. An abnormal operation is considered to have occurred and then a jump is made to the damage process, by which the operation of the camera is stopped, the occurrence of an error is displayed, and a selected error code is written into the error history storage unit 6 in accordance with the previously described procedure. The storage unit 6 is thus updated.

Within the predetermined period of time, a decision is made in step S203 as to whether or not the motor has been driven by the preset number of pulses necessary for gear switching. If it has not, then a return is made to step S201.

On the other hand, when the motor has been driven by the necessary number of pulses, the electromagnet 40 is turned OFF (step S204). After that, to detect the stopper state, the stopper PI 46 is selected as position detecting means (step S204).

The motor 20 continues to be duty driven (step S206). A decision is made in step S207 as to whether the predetermined period of time has elapsed. If it has, then an abnormal operation is considered to have occurred and then a jump is made to the damage process, by which the operation of the camera is stopped, the occurrence of an error is displayed, and a selected error code is written into the error history storage unit 6 in accordance with the previously described procedure. The storage unit 6 is thus updated.

When the third gear arm 61 is switched into the wind position, the first, second and third stoppers 35, 41 and 72 has fallen, so that the output of the stopper PI 46 has changed from OFF to ON.

If the decision in step S207 is that the predetermined period of time has not elapsed yet, then a decision is made in step S208 as to whether the output of the stopper PI 46 has changed. If the output remains OFF, then a return is made to step S206.

If, on the other hand, the output of the stopper PI 46 has become ON, then the motor 20 is braked to a stop (step S209).

Finally, the position information of the third gear arm 61 is updated (step S210) and the routine is then terminated.

Next, the loose control will be described in detail. Table 3 shows the types of clinging release pulses (hereinafter referred to as loose pulses) stored in the clinging release constant storage unit 89 and their outline.

TABLE 3

| Loose pulses | Gear switching | | Outline |
|---|---|---|---|
| loose A | 1. set<br>2. set | → zoom<br>→ zoom<br>→ rewind | 1. Releasing second gear arm and second stopper from each other after setup operation for moving lens barrel from retracted position into WIDE position<br>2. Switching second gear arm to setdown side in gear switching into autoload or rewind when lens barrel is retracted (setdown state) |
| loose A' | 1. zoom<br>2. zoom | → wind<br>→ wind<br>→ set | 1. Releasing third gear arm and third stopper from each other in gear switching for film winding after zoom-up operation and shooting when barrel is in shooting range between WIDE and TELE positions<br>2. Positioning third gear arm in mesh with zoom gear in switching from zoom gear into wind gear or set gear before and after autoload (barrel is retracted) |
| loose B1 | set | → zoom | Releasing clinging state of first gear arm and first stopper resulting from loose A process in switching into zoom gear after setup operation for moving barrel from retracted position into WIDE position |

TABLE 3-continued

| Loose pulses | Gear switching | | Outline |
|---|---|---|---|
| loose B2 | set | → zoom<br>→ rewind | releasing clinging state of first gear arm and first into stopper resulting from loose A process in switching zoom gear for film prewinding or rewinding |
| loose B3 | — | | releasing clinging state of first gear arm and first stopper resulting from setdown operation after retraction process of barrel |
| loose B1' | zoom | → wind<br>→ set | releasing clinging state of first gear arm and first stopper resulting from loose A' process in switching from zoom gear to wind gear or set gear before and after film prewinding |
| loose B2' | zoom | → set | releasing clinging state of first gear arm and first stopper resulting from zoom-down operation in switching into set gear after motor driving in zoom-down direction by a gear predetermined number of pulses for initializing third arm when barrel is retracted (loose A' process is not carried out) |
| loose B3' | zoom | → wind | selected in gear switching for film winding after shooting<br>1. releasing clinging state of first gear arm and first stopper resulting from loose A' process in gear switching after zoom-up operation<br>2. releasing clinging state of first gear arm and first stopper resulting from zoom-down operation in gear switching after zoom-down operation (loose A' is not carried out) |
| loose B4' | zoom | → set | releasing clinging state of first gear arm and first stopper resulting from zoom-down operation in switching from zoom gear into set gear after barrel has been hit against mechanism by zoom-down operation to retract barrel (loose A' is not carried out) |

In table 3, loose A is set up to release the clinging state of the second stopper 41 and the second gear arm 45 in order to turn the electromagnet 40 ON either in the case of switching from the gear position (FIG. 8A) allowing setup/setdown into the position allowing zoom-up/down or in the case of switching from the gear position allowing setup/down into the gear position allowing rewinding (FIG. 10B) when the first gear arm 32 stays on the set/rewind side.

In switching to the zoom gear 65 in step S102 after the execution of the setup operation in step S101 of FIG. 19, the second stopper 41 and the second gear arm 45, which have been placed in the clinging state as a result of driving the motor 20 in the CW direction in the setup operation, are released from each other by driving the motor 20 in the CCW direction by the number of pulses corresponding to the loose A.

Further, in switching from the set gear 48 into the rewind gear 51 prior to the execution of the rewinding process in step S119 or in switching into the zoom gear 65 in the middle of switching into the wind gear 70 before the execution of the prewinding process in step S123, the motor 20 is driven in the CCW direction by the loose A pulses, thereby allowing the second gear arm 45 to hit against the positioning member 44 to ensure a gap between the second stopper 41 and the second gear arm 45.

Next, loose A' is set up to release the clinging state of the third stopper 72 and the third gear arm 61 either in the case of switching from the gear position (FIG. 9A) allowing zoom-up/down into the position (FIG. 12A) allowing winding or in the case of switching from the gear position allowing zoom-up/down into the gear position allowing setup/down (FIG. 10B) when the first gear arm 32 stays on the zoom/wind side.

That is, in winding the film one frame in S108 after the execution of the zoom-up operation in step S111 of FIG. 19, the third stopper 72 and the third gear arm 61, which have been placed in the clinging state as a result of driving the motor 20 in the CCW direction in the zoom-up operation when switching to the wind gear 70, are released from each other by driving the motor 20 in the CW direction by the number of pulses corresponding to the loose A'.

Also, in switching to the wind gear 70 in step S122 prior to the execution of the prewinding process in step S123 or in switching from the wind gear 70 into the set gear 48 in step S124 after the execution of the prewinding process, the motor 20 is driven in the CW direction by the loose A' pulses, thereby allowing the third gear arm 61 to be positioned in mesh with the zoom gear 65 to ensure a gap between the third stopper 72 and the third gear arm 61.

Loose B is set up to release the first gear arm 32 and the first stopper 35 from each other, which will cling to each other as a result of execution of the loose A process to release the second stopper 41 and the second gear arm 45 from each other or the execution of the setdown operation. The loose B includes three types (B1, B2, and B3) to suit the positions of the respective members in the camera and their driving situations.

First, the loose B1 is set up to release the first gear arm 32 and the first stopper 35 from each other, which cling to each other when the motor 20 is driven in the CCW direction by the loose A pulses for the setup operation of the lens barrel 83 from its retracted position during gear switching in step S102 of FIG. 19.

The loose B2 is set up to remove mechanical flexure and release the cling state of the first gear arm 32 and the first stopper 35 which occur as a result of driving the motor 20 in the CCW direction by the number of the loose A pulses when switching the first gear arm from the set gear 48 into the zoom gear 65 during the rewind gear switching in step S122 of FIG. 19 (step S133 of FIG. 20) or when switching to the rewind gear 51 in step S118 of FIG. 19 at the time the lens barrel is in its retracted position.

The loose B3 is set up to release the first gear arm 32 and the first stopper 35 from each other, which cling to each other when the motor 20 is driven in the CCW direction to retract the lens barrel 83 during the setdown operation in step S116 of FIG. 19. When the first gear arm and the first stopper are left with force applied thereto, there arises the possibility of gear deformation. The loose B3 pulses are used to avoid this.

Loose B' is set as the number of pulses that drives the motor 20 in the CCW direction to release the clinging state of the first gear arm 32 and the first stopper 35 (see FIG. 9B) as a result of the execution of the zoom operation (the motor is driven in the CW direction) or the execution of the loose A' process to release the third gear arm 72 and the third gear arm 61 from each other. As the loose B', four types (B1', B2', B3', and B4') are set up to suit the positions of the respective members in the camera and their driving situations.

The loose B1' is set up to release the clinging state of the first gear arm 32 and the first stopper 35 which occur as a result of executing the loose A' process in switching the gear driving system from the zoom gear 65 into the set gear 48 in step S120 after the execution of the rewind operation in step S119 of FIG. 19 or in switching from the zoom gear 65 into the wind gear 70 in step S122 at the time the lens barrel is in its retracted position before the prewinding in step S123.

The loose B2' is the number of pulses that is set to release the clinging state of the first gear arm 32 and the first stopper 35 which occurs when the motor 20 is driven in the CW direction so as to cause the third planetary gear 62 of the third gear arm 61 to mesh with the zoom gear 65 in initializing the gear positions with the lens barrel 83 retracted.

The loose B3' is selected at the time of the gear switching operation (step S107 in FIG. 19) for film winding after the zoom-up/down operation and exposure of the film and adapted to release the clinging state of the first gear arm 32 and the first stopper 35 which occurs as a result of the execution of the loose A' process after the zoom-up operation or the execution of the zoom-down operation.

The loose B4' is selected at the time of switching to the set gear 48 in step S115 of FIG. 19 after the lens barrel 83 is moved from its shooting position into its retracted position by zoom-down operation and adapted to release the mechanical flexure and the clinging state of the first gear arm 32 and the first stopper 35.

Table 4 shows ways to make a selection from among the loose pulses in accordance with the position of the first gear arm 32, the position of the lens barrel 83, and the driving situations.

When the first gear arm 32 is on the set/rewind side and the setup of the lens barrel 83 is completed, the loose A and the loose B1 are selected as shown in row (1) of Table 4. This corresponds to the switching in step S102 of FIG. 19.

When the first gear arm 32 is on the zoom/wind side, the lens barrel 83 is positioned between WIDE and TELE settings, and a zoom-up operation is performed, the loose A' and the loose B3' are selected as shown in row (2) of Table 4.

When the position of each of the first gear arm 32 and the lens barrel 83 remain unchanged from the above and a zoom-down operation is performed, the loose B3' is selected as shown in row (3) of Table 4. This is because the zoom-down operation plays the role of the loose A'. This corresponds to the switching in step S107 of FIG. 19.

When the first gear arm 32 is on the zoom/wind side, the setup of the lens barrel 83 is completed, and a zoom-down operation is performed, the loose B4' is selected as shown in row (4) of Table 4.

When the first gear arm 32 is on the zoom/wind side, the lens barrel 83 is retracted, and a zoom-down operation is performed, the loose B2' is selected as shown in row (5) of Table 4. This corresponds to the switching in step S115 of FIG. 19.

When the first gear arm 32 is on the set/rewind side and the lens barrel 83 is retracted, the loose A and the loose B2 are selected as shown in row (6) of Table 4. This corresponds to switching of the first gear arm 32 from the set/rewind side to the zoom/wind side in steps S118 and S122 of FIG. 19.

When the first gear arm 32 is positioned on the zoom/wind side and the lens barrel 83 is retracted, the loose A' and the loose B1' are selected as shown in row (7) of Table 4. This corresponds to switching of the first gear arm 32 from the zoom/wind side into the set/rewind side in step S120 and switching of the third gear arm 61 from the zoom gear 61 into the wind gear 70 in step S22 in FIG. 19.

Figure 26:
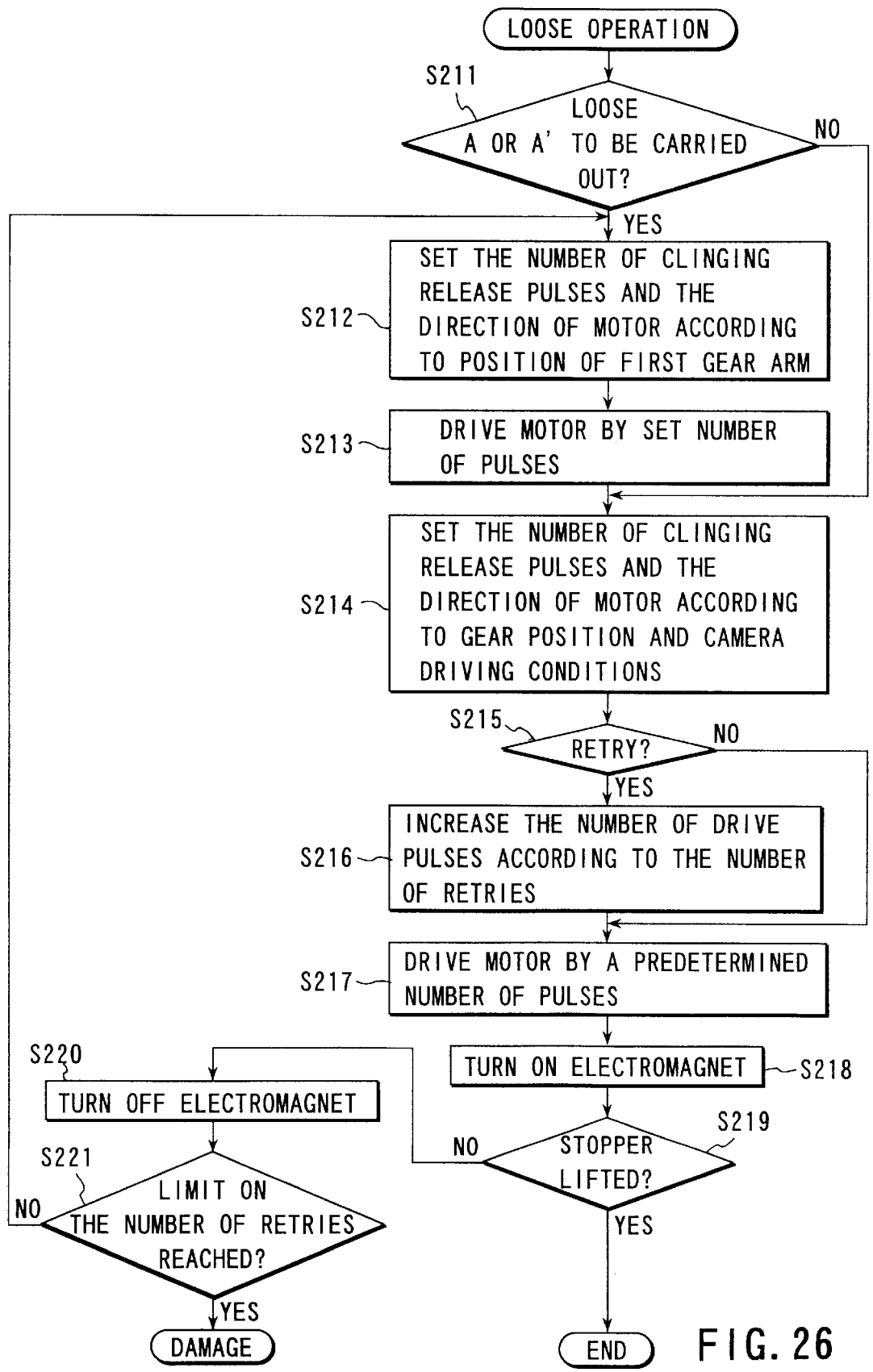
FIG. 26 is a flowchart illustrating looseness control in the embodiment.

FIG. 26 is a flowchart for loose control.

First, a decision is made of whether the loose A or the loose A' to carry out (step S211). If a zoom-down operation has been performed immediately prior to the execution of a switching operation, then the second gear arm 45 and the second stopper 41 or the third gear arm 61 and the third stopper 72 would have already been released from each other. In this case, a jump is made over the next two steps to step S214 to carry out the loose B and the loose B'.

TABLE 4

| | first gear arm | barrel position | driving situations | loose A · A' | loose B · B' | switching |
|---|---|---|---|---|---|---|
| (1) driving from retracted position to WIDE position | S/R | setup completed | — | loose A | loose B1 | first gear arm S/R → W/Z |
| (2) one-frame winding (1) | W/Z | WIDE - TELE position | zoom-up | loose A' | loose B3' | third gear arm zoom → wind |
| (3) one-frame winding (2) | W/Z | WIDE - TELE position | zoom-down | — | loose B3' | third gear arm zoom → wind |
| (4) retraction (1) | W/Z | setup completed | zoom-down | — | loose B4' | first gear arm W/Z → S/R |
| (5) retraction (2) | W/Z | retracted | zoom-down | — | loose B2' | first gear arm W/Z → S/R |
| (6) winding prewinding | S/R | retracted | — | loose A | loose B2 | first gear arm S/R → W/Z second gear arm set → rewind |
| (7) prewinding | W/Z | retracted | — | loose A' | loose B1' | first gear arm W/Z → S/R third gear arm zoom → wind |

When it is decided that either the loose A or the loose A' is to be carried out, the loose A is selected when the first gear arm 32 is positioned on the set/wind side and the drive direction of the motor 20 is set to the CCW direction. When positioned on the zoom/wind side, on the other hand, the loose A is selected and the motor is set to rotate in the CW direction (step S212). The motor 20 is then rotated in the set direction by the set number of pulses to release the clinging state of the second gear arm 45 and the second stopper 41 or the third arm gear 61 and the third stopper 72 (step S213).

To release the clinging state of the first gear arm 32 and the first stopper 35 resulting from the execution of the loose A or A' or the zoom-down operation, the loose B or the loose B' is selected based on the gear positions and the zoom information. When the loose B is selected, the motor 20 is set to rotate in the CW direction, whereas, when the loose B' is selected, the motor is set to rotate in the CCW direction (step S214).

Next, a decision is made in step S215 as to whether the loose operation is a retry or not. If it is not, then a jump is made to step S217 to be described later. In the case of a retry, the loose B or B' pulses are increased in number by a predetermined number according to the number of retries (step S216).

This is because the fixed number of pulses is considered to be insufficient to raise the first stopper 35.

The motor 20 is then driven by a predetermined number of pulses to release the first gear arm 32 and the first stopper 35 from each other (step S217).

At the termination of the loose control, the electromagnet 40 is energized to raise the first stopper 35 (step S218).

A decision is then made in step S219 as to whether or not the first stopper 35 has been lifted. If it has not (that is, if the signal of the stopper PI 46 has not changed), then the power to the electromagnet 40 is turned OFF in step S220 and a decision is made in step S221 as to whether or not the limit on the number of retries is reached.

If the first stopper 35 is not lifted even after a predetermined number of retries, then it is decided that an abnormal operation has occurred. A jump is made to the damage process, by which the operation of the camera is stopped, the occurrence of an error is displayed, and a selected error code is written into the error history storage unit 6 in accordance with the previously described procedure. The storage unit 6 is thus updated. In this embodiment, the maximum number of retries is set at 16 by way of example.

When the maximum number of retries is not reached, the procedure returns to step S212 to make a retry from the loose A/A' process.

On the other hand, when the first stopper 35 was lifted in step S219, the stopper PI 46 is switched from ON to OFF. When the stopper PI 46 has thus changed, the routine is terminated with the electromagnet 40 energized.

Figure 27:
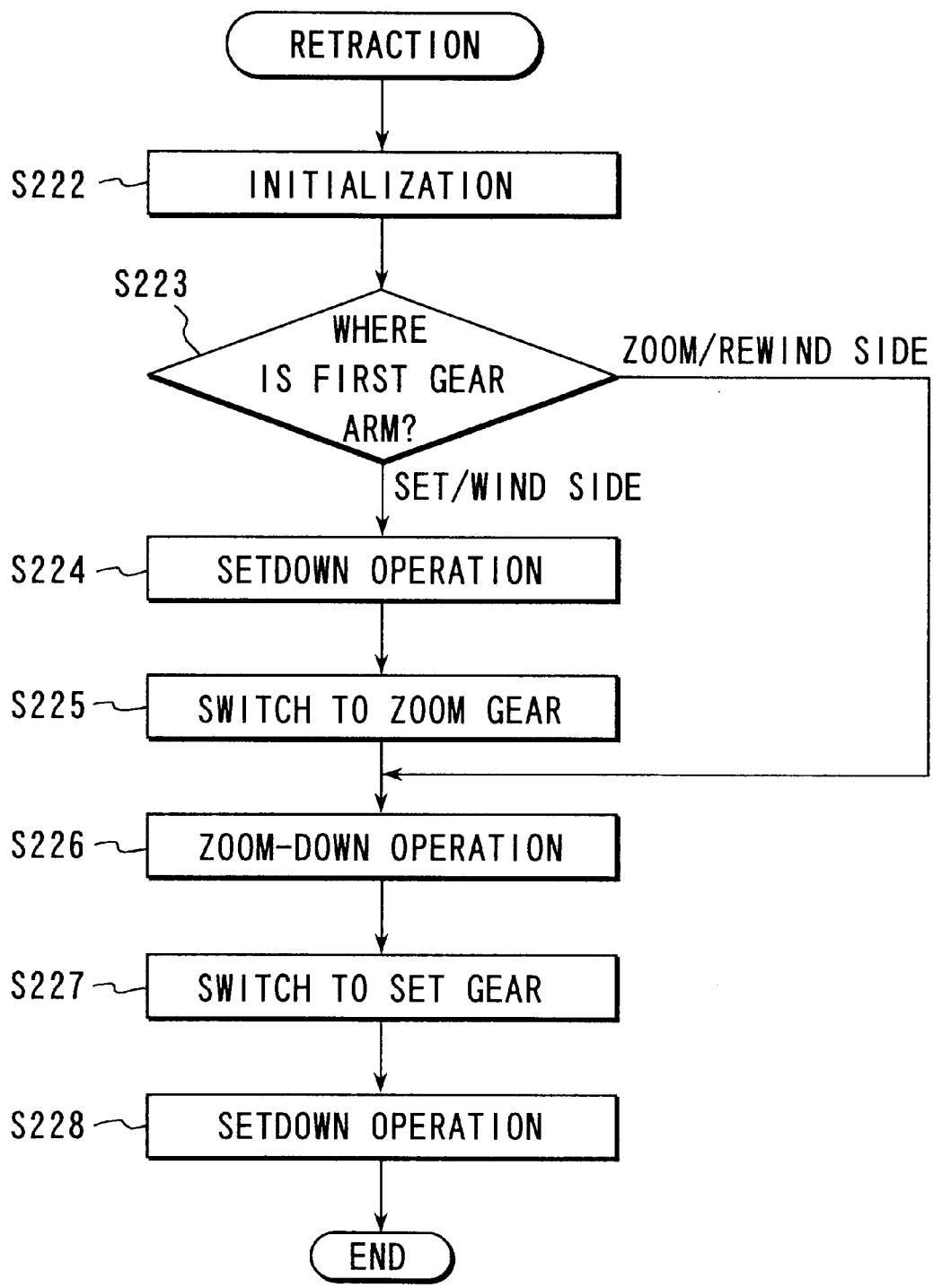
FIG. 27 is a flowchart illustrating lens-retraction control in the embodiment.

FIG. 27 is a flowchart for lens barrel retraction control.

This routine starts when the battery of the camera is replaced with a new one or when the power switch is turned OFF.

First, in step S222, the gear arm position information and the zoom position information are read from the gear arm position storage unit 87 and the zoom position storage unit 88, respectively, and the controller (CPU) 90 is initialized. Using the position information of the first gear arm 32, the controller initializes the first gear arm so that it is positioned on the set/rewind side or the zoom/wind side.

A decision is then made in step S223 as to which of the set/wind side and the zoom/rewind side the first gear arm 32 is positioned on. When it is positioned on the set/rewind side, a setdown operation is performed until stopper occurs, thereby initializing the second gear arm 45 so that it meshes with the set gear 48 (step S224).

After stopper has been detected, the first gear arm 32 is switched from the set/rewind side into the zoom/wind side (step S225).

When the first gear arm 32 is positioned on the zoom/rewind side in step S223, steps S223 and S224 are skipped (this corresponds to the camera power-OFF process in FIG. 19).

In a zoom-down process in step S226, the motor 20 is driven in the CW direction until a predetermined number of pulses is reached or stopper is detected. Thereby, the third gear arm 61 is initialized so that it is positioned in mesh with the zoom gear 65. Further, the lens barrel 83 is moved back up to the position in which it can be housed.

In order to retract the lens barrel 83, switching is made from the gear train for zoom-up/down to the gear train for setup/down (step S227).

After being switched into the setup/down side, the motor 20 is driven in the CCW direction until stopper is detected in step S228, thereby moving the lens barrel 83 into the position in which it is housed. Thus, the routine is terminated.

Figure 28:
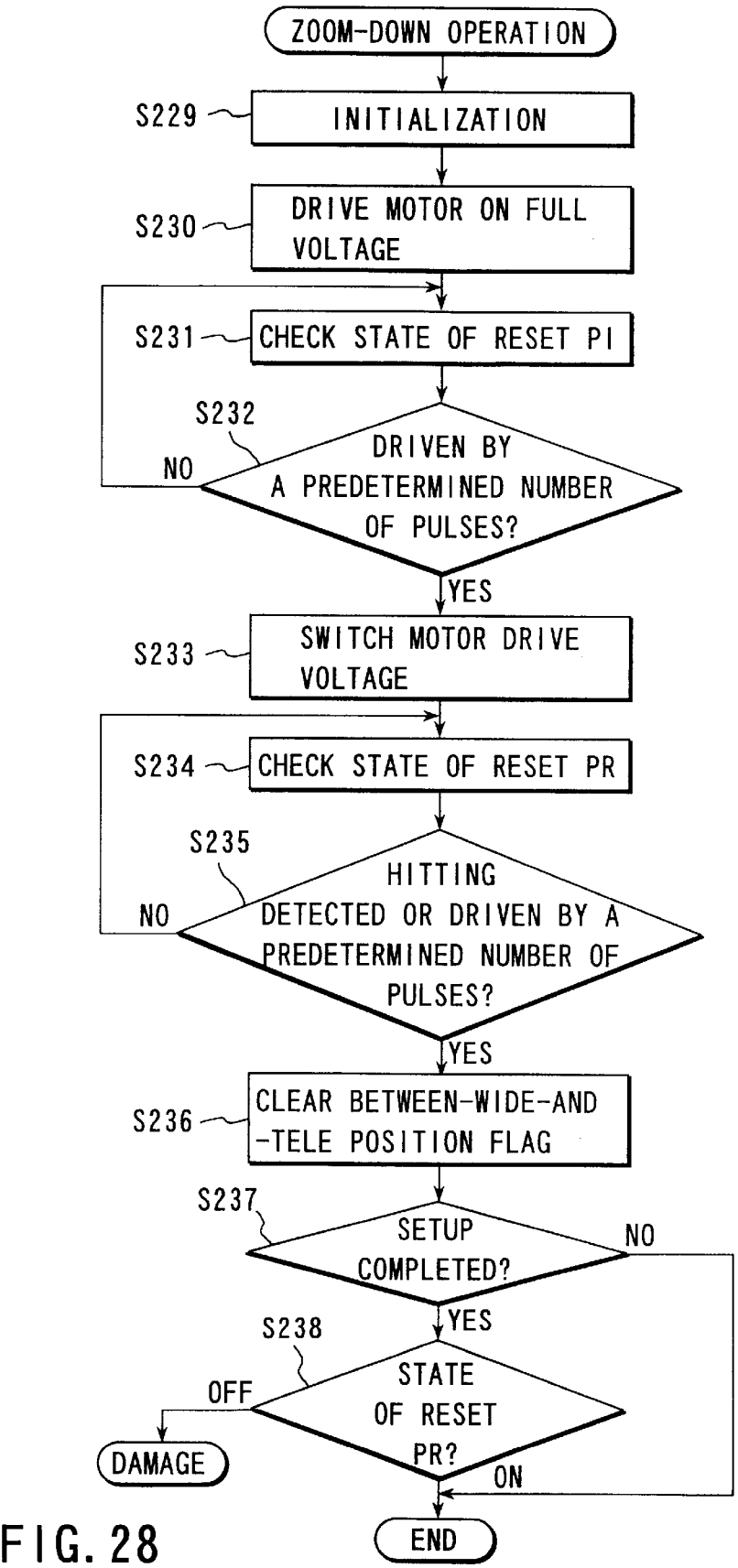
FIG. 28 is a flowchart illustrating the zoom-down process invoked in the subroutine of FIG. 27.
Figure 29:
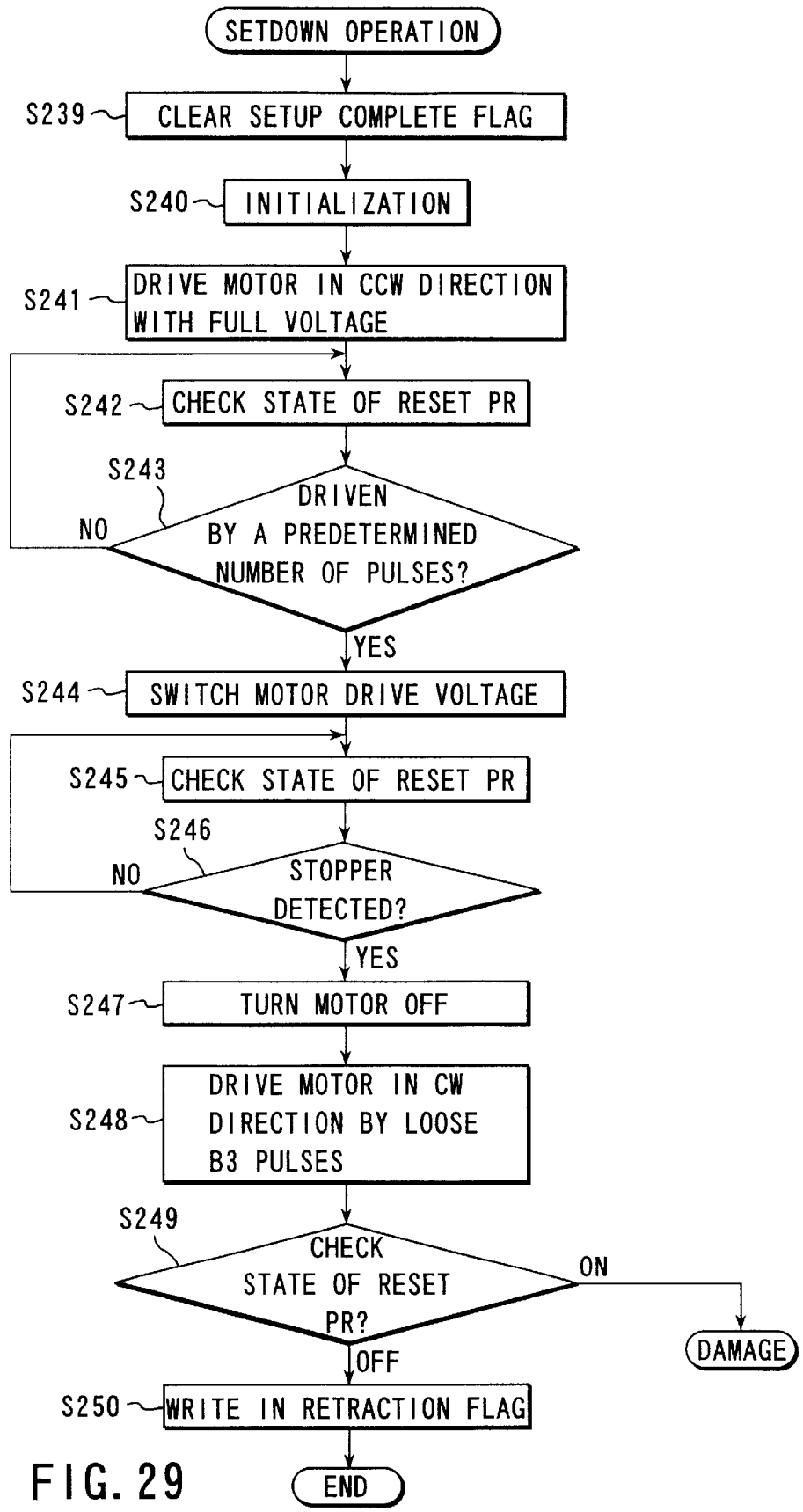
FIG. 29 is a flowchart illustrating the setdown process invoked in the subroutine of FIG. 24.

FIG. 28 is a flowchart for the zoom-down process in step S226 of FIG. 24.

In initialization (step S229), the motor PI and the reset PR 84 are set up as position detecting means. When the reset PR 46 is in the ON state, it indicates that the lens barrel is in the shootable position. Therefore, the setup complete state is set in the EEPROM, the drive voltage of the motor 20 is set to the full voltage, and the motor is driven in the CW direction (step S230).

The state of the reset PR 84 is checked all the time during the time the motor is being driven. When a change in its state is detected, the current zoom position information is rewritten by the position information of the lens barrel 83 at a preset point of change in the state of the reset PR 84 and a setup complete flag is written into (step S231).

A decision is then made as to whether or not a predetermined number of pulses has been output from the motor 20 (step S232). If it has not, a return is made to step S231 to repeat the above operation.

When the predetermined number of pulses is output and the motor 20 has been driven nearly by the amount that stopper is detected, the driven voltage of the motor is switched from the full voltage to a low voltage (step S233). This is because there is the possibility that the further driving of the motor on the full voltage may cause the mechanism to break down due to stopper.

The state of the reset PR 84 is further checked (step S234). A decision is then made as to whether or not stopper has been detected by the motor PI output being stopped or more pulses than the predetermined number have been output (step S235). If not, a return is made to step S234 to continue the driving of the motor 20 with the low voltage while checking the state of the reset PR 84.

When stopper is detected or the motor 20 has been driven by more pulses than the predetermined number, it is decided that the third gear arm 61 has been initialized, so that the lens barrel 83 has been moved into the position in which it can be housed and then the zoom position information between WIDE and TELE settings is cleared (step S236).

A decision is then made in step S237 as to whether or not the lens barrel 83 is positioned in the setup completed state (whether or not the setup completed state flag has been set). If it is, then a check is made as to whether the reset PR 84 has been in ON state (step S138). If the reset PR 84 is OFF, then it is decided that the lens barrel was stopped forcibly by hand during the time it is being driven. An abnormal operation is considered to have occurred and then a jump is made to the damage process, by which the operation of the camera is stopped, the occurrence of an error is displayed, and a selected error code is written into the error history storage unit 6 in accordance with the previously described procedure. The storage unit 6 is thus updated.

When the lens barrel 83 is not in the setup complete state (namely, it is in the retracted position) in step S237 or when the reset PR 84 is ON in step 238 with the lens barrel being in the setup complete state, the routine is terminated.

FIG. 20 is a flowchart for the setdown operation in steps S224 and S228 of FIG. 27.

This setdown operation is to move the lens barrel 83 from its shooting position (see FIG. 16) into its housed position (see FIG. 15). Before starting driving the lens barrel, the setup complete flag is cleared first (step S239).

In initialization step S240, the motor PI and the reset PR 84 are set up to output position detect signals.

The motor is then driven in the CCW direction with the full voltage (step S241). During the time the motor is driven, the state of the reset PR 84 is checked all the time. When its state changes, the current zoom position information is rewritten by the preset position information (step S242).

A decision is then made in step S243 as to whether or not a predetermined number of pulses has been output from the motor 20. When the predetermined number of pulses is not reached, a return is made to step S242 to continue driving the motor with the full voltage while checking the state of the reset PR 84.

When the motor has been driven by the predetermined number of pulses, it is decided that the neighborhood of the position of stopper is reached. The drive voltage of the motor 20 is switched from the full voltage to a low voltage adapted for stopper (this low driving voltage for hitting is different from that in the zoom-down operation) (step S244).

The state of the reset PR 84 is checked (step S245) and then stopper is detected (step S246). Until the output of the motor 20 stops, the motor is driven with the low voltage, including stopper detection.

When it is decided that the output of the motor PI stops and the lens barrel 83 has been retracted, the power to the motor 20 is turned OFF (S247).

At this point, strong force is applied to the first gear arm 32 and the first stopper 35 which are clinging to each other because the motor 20 was driven in the CCW direction for the setdown operation. In the even that they are left in that state for a long time with the power turned OFF, there will arises the possibility of gear deformation. It is thus required to release the clinging state of the first gear arm and the first stopper. To this end, the motor is driven in the CW direction by the number of the loose B2 pulses (step S248).

A decision is then made in step S249 as to whether the reset PR 84 is ON, namely, whether the sensor is present over the silver seal. If it is, it is decided that an abnormal operation has occurred. A jump is then made to the damage process, by which the operation of the camera is stopped, the occurrence of an error is displayed, and a selected error code is written into the error history storage unit 6 in accordance with the previously described procedure. The storage unit 6 is thus updated.

If, on the other hand, the reset PR 84 is OFF in state S249, then the retraction flag is written into the EEPROM (step S250), thus terminating the routine.

Although the embodiment has been described as using the number of pulses as the clinging state release constant, the time may be used instead.

In the embodiment described so far, as the loads on the driving mechanism of the camera, winding and rewinding of film, moving of the lens barrel into shooting position and retracting of it (setup/down), and the zoom-up/down of the lens barrel have been set. In this case, therefore, a selection is made from among the cling state release constants based on the zoom position information and the gear position information. Alternatively, shutter releasing and shutter charging, barrier opening and closing, moving autofocus lens forward and backward, and moving flash unit may be set as the loads on the driving mechanism.

If, in this case, the clinging state release constants are set separately based on conditions and positions of the loads and gear position information, the same effect will be attained.

According to this embodiment, since an appropriate clinging state release constant can be selected according to the gear positions and the camera driving conditions, a camera gear coupling device of good quality can be provided which makes no failure in gear switching and operates stably.

As described so far, by storing abnormal operations in a sequential order of time and having a knowledge of their particulars so far, a self-diagnostic camera is provided which can make clear causes of the abnormal operations and can easily identify parts to be fixed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A camera with a self-diagnostic function comprising:

checking means for, during the operation of each of components of the camera, checking it for abnormal operations based on its preset operation;

error code storage means for prestoring error codes each of which is made to correspond to an abnormal operation of each of the components;

error history storage means for storing abnormal operations that occurred before as error codes in a sequential order of time; and adding and updating means for, when an abnormal operation is detected by the checking means, reading an error code corresponding to that abnormal operation from the error code storage means and adding it to the error history storage means as the most recent error code and thereby updating the error history storage means.

2. The camera according to claim 1, wherein the error history storage means has a table for storing a plurality of error codes selected by the adding and updating means and is adapted to transfer all error codes already stored to the adding and updating means if a predetermined storage capacity of the table is exceeded when the adding and updating means enters a recent error code into the error history storage means, add the new error code to the end of the table, shift addresses of the error codes to discard the least recently stored error code, and enter the recent error code into the table.

3. The camera according to claim 1, further comprising display means and wherein, when an abnormal operation is detected by the check means, the occurrence of it is displayed by the display means after an attempt to perform reoperations a predetermined number of times or after the immediately stoppage of the operation of the camera and then an error code corresponding to that abnormal operation is added to the error history storage.

4. A camera with a self-diagnostic function comprising:
   checking means for, during the successive operations of the camera, checking whether each operation is normal or abnormal;
   abnormality code setting means for, when the result of a check performed on an operation indicates abnormality, setting an abnormality code (error code) corresponding to the operation;
   storage means for storing the abnormality code set by the abnormality code setting means; and
   memory control means for storing the abnormality code into the storage means in such a way that it is added to abnormality codes already stored.

5. The camera according to claim 4, wherein, in such a case where the number of abnormality codes to be stored may exceed a predetermined number, the memory control means removes the least recently stored abnormality code from the storage means and adds the most recently set abnormality code to the storage means.

6. The camera according to claim 4, wherein the storage means comprises a nonvolatile memory.

7. A self-diagnostic method for use with a camera comprising the steps of:
   during the operation of each of components of the camera, checking it for abnormal operations based on its preset operation;
   stopping the operation of the camera when the result of the checking step indicates an abnormal operation;
   selecting from among preset error codes an error code corresponding to that abnormal operation;
   storing selected error codes in memory having a predetermined storage capacity in a sequential order of time; and
   when the storage capacity of the memory is exceeded, updating the memory by removing the least recently stored error code from the memory and adding the most recent error code to the end of the memory.

8. The camera according to claim 7, wherein, in the updating step, when the storage capacity of the memory is exceeded in storing the most recent error data, all the error codes already stored are read temporarily into a table, the most recent error code is added to the end of the table, and then addresses are shifted to thereby remove the least recently stored error code.

9. The method according to claim 8, wherein, when an abnormal operation is detected by the check means, the occurrence of it is visually displayed after an attempt to perform reoperations a predetermined number of times or after the immediately stoppage of the operation of the camera and then an error code corresponding to that abnormal operation is added to the memory.

10. A self-diagnostic camera comprising:
    abnormality sensors for monitoring operating conditions of mechanical components in the camera;
    error code output means responsive to the sensors for, upon detecting the occurrence of abnormality in the operation of a mechanical component, outputting an error code corresponding to the type of the detected abnormality; and
    error history storage means having a predetermined storage capacity for error codes in due order outputted from the error code output means,
    when the storage capacity is reached, the storage means removing the least recently stored error code and adds the most recent error code at its end.

11. A self-diagnostic camera according to claim 10, further comprising read-out means for, outputting the error code stored in the error history storage means.

12. The camera according to claim 10, further comprising display means for, simultaneously with writing an error code into the error history storage means, displaying the occurrence of abnormality.

13. The camera according to claim 10, wherein the error history storage means comprises a nonvolatile memory.

14. The camera according to claim 10, wherein each of the abnormality sensors comprises an optical sensor that detects whether a corresponding mechanical member has a normal operating stroke.

15. A self-diagnostic camera comprising:
    checking means for, during the operation of each of components of the camera, comparing its current operation with its preset mode of operation to detect the occurrence of an abnormal operation;
    means for outputting error information representing an abnormally operating component; and
    error history storage means for storing error information outputted so far in a sequential order of time.

* * * * *